United States Patent
Border et al.

(10) Patent No.: US 8,134,628 B2
(45) Date of Patent: Mar. 13, 2012

(54) METHODS FOR CAPTURING AND READING OUT IMAGES FROM AN IMAGE SENSOR

(75) Inventors: John N. Border, Walworth, NY (US); John T. Compton, LeRoy, NY (US); David N. Nichols, Fairport, NY (US)

(73) Assignee: Truesense Imaging, Inc., Rochester, NY (US)

( * ) Notice: Subject to any disclaimer, the term of this patent is extended or adjusted under 35 U.S.C. 154(b) by 392 days.

(21) Appl. No.: 12/570,017

(22) Filed: Sep. 30, 2009

(65) Prior Publication Data
US 2011/0075009 A1 Mar. 31, 2011

(51) Int. Cl.
H04N 3/14 (2006.01)
H04N 5/335 (2011.01)
(52) U.S. Cl. ........................... 348/311; 348/294
(58) Field of Classification Search .................. 348/294, 348/311, 317
See application file for complete search history.

(56) References Cited

U.S. PATENT DOCUMENTS

| | | | |
|---|---|---|---|
| 4,330,796 | A | 5/1982 | Anagnostopoulos et al. |
| 6,115,065 | A | 9/2000 | Yadid-Pecht et al. |
| 2002/0089598 | A1 | 7/2002 | Ishimoto et al. |
| 2002/0141002 | A1 | 10/2002 | Takano et al. |
| 2005/0045980 | A1 | 3/2005 | Guidash |
| 2006/0017837 | A1 | 1/2006 | Sorek et al. |
| 2007/0002164 | A1 | 1/2007 | Ward et al. |
| 2007/0002165 | A1 | 1/2007 | Parks |
| 2008/0018770 | A1 | 1/2008 | Kato |
| 2009/0021588 | A1 | 1/2009 | Border et al. |
| 2009/0021612 | A1 | 1/2009 | Hamilton, Jr. et al. |
| 2010/0097505 | A1* | 4/2010 | Meisenzahl ................ 348/273 |
| 2010/0104209 | A1 | 4/2010 | Deever et al. |
| 2010/0157126 | A1* | 6/2010 | Compton et al. .......... 348/311 |
| 2011/0074996 | A1* | 3/2011 | Wang et al. ............... 348/311 |

OTHER PUBLICATIONS

Kobayashi et al., "A CCD Image Sensor and an Imaging System with Scene Adaptability for DSC Applications", International Symposium on Technologies for Digital Photo Fulfillment, Society for Imaging Science and Technology, Feb. 2009.

* cited by examiner

Primary Examiner — Gevell Selby
(74) Attorney, Agent, or Firm — Bingham McCutchen LLP

(57) ABSTRACT

Multiple images are captured where the exposure times for some of the images overlap and the images are spatially overlapped. Charge packets are transferred from one or more portions of pixels after particular integration periods, thereby enabling the portion or portions of pixels to begin another integration period while one or more other portions of pixels continue to integrate charge. Charge packets may be binned during readout of the images from the image sensor. Comparison of two or more images having different lengths of overlapping or non-overlapping exposure periods provides motion information. The multiple images can then be aligned to compensate for motion between the images and assembled into a combined image with an improved signal to noise ratio and reduced motion blur.

10 Claims, 32 Drawing Sheets

FIG. 21A
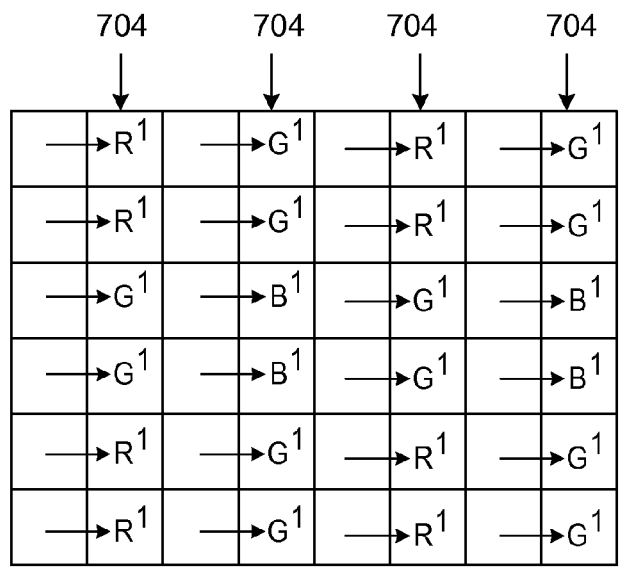
FIG. 21B
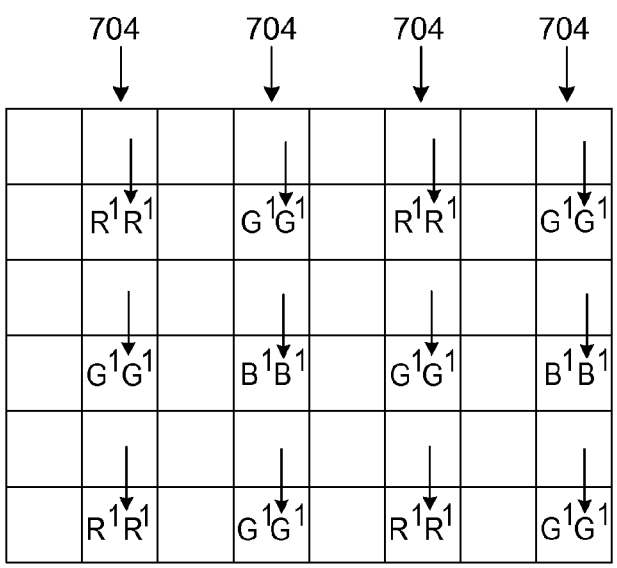
FIG. 21C

METHODS FOR CAPTURING AND READING OUT IMAGES FROM AN IMAGE SENSOR

TECHNICAL FIELD

The present invention relates generally to image sensors for use in digital cameras and other types of image capture devices. Still more particularly, the present invention relates to methods for capturing and reading out multiple images from an image sensor.

BACKGROUND

Capturing a quality image when the scene to be captured includes low light or fast motion is challenging. If a long exposure is used to increase the amount of light that is collected, thereby reducing the noise in the image, any motion present from the camera or the movement of objects within the scene results in motion blur artifacts in the image. Alternately, if a short exposure is used to reduce motion blur, noise will be present in the image due to the low signal at the image sensor. One solution to this photographic challenge is to capture multiple short exposure images which each have reduced motion blur due to their short exposure times. The multiple short exposure images are then combined in a way that compensates for the motion that occurs between the images to produce an improved image which effectively has an exposure time that is equal to the combined exposure time of the multiple short exposure images and an equally higher combined signal with reduced noise due to averaging between the multiple images.

An overlapped readout technique for an image sensor that produces an image with reduced motion blur is described in co-pending United States Patent Application 2009/0021612. Charge from a portion of the photodetectors is transferred into the vertical charge-coupled device (VCCD) shift registers followed by readout of a component image. This technique may extend the time between the overlapped images because additional time may be required to readout the component image from the image sensor. As a result, it may be difficult to capture a series of images with short exposure times in rapid succession to provide a series of images that accurately illustrate the motion that is occurring in the scene.

Another solution to this photographic challenge is disclosed in United States Patent Application 2006/0017837. A series of images are captured, some with short exposures and some with long exposures. A combined image is then produced that has reduced motion blur from the short exposure images and reduced noise from the long exposure images. However, the resulting large difference in length of exposure times between the short exposure image and the long exposure may make it difficult to combine the two images. Also since the two exposures are captured at different times it may be difficult to align the two images when motion is present, particularly if there is local motion present produced by objects moving within the scene.

A method for capturing multiple images in rapid succession using a CCD sensor is disclosed in United States Patent Application 2007/0002165. A first image is captured and the charge transferred into the VCCD using only the rows associated with a first field. The photodetectors are then reset and a second image is captured and transferred into the VCCD using only the rows associated with the second field. The photodetectors are reset again before a third image is captured. The VCCD is then readout which reads the first and second images into the horizontal charge coupled device (HCCD) and converts the charge data for the two images into digital data. The third image is then transferred to the VCCDs, readout, and converted to digital data. While this method reduces the time between captures since the time between captures is not increased by having to wait for the image sensor readout, the photodetectors are reset for each image, so that the images are all captured at different times. The alignment of the multiple images may be challenging in some situations.

A dual capture mode of operation is described in a paper entitled "A CCD Image Sensor and Imaging System with Scene Adaptability for DSC Applications" (Int Sym Tech for Digital Photo Fulfillment, Soc, Imaging Sci & Tech, February 2009) by M. Kobayashi, S. Tanaka, K. Oda, K. Ikeda, K. Hayashi, and T. Nishimura. A CCD image sensor is used to capture one image with a long exposure time along with a second image having a short exposure time. The two images are captured with different rows of pixels in the same image sensor. A "sweep-out process" is used to reset the pixels that are used to provide the second short exposure image. As such, each pixel is used in only one of the two images and the method is limited to capture of two images in a set.

SUMMARY

Multiple images are captured with different integration periods such that a portion of the pixels are used to capture more than one image and the integration periods of some of the images overlap. Embodiments in accordance with the invention use two or more fields of pixels in an image sensor. The photosensitive areas in all of the pixels are first reset as a group. The different fields of pixels are then effectively reset individually by transferring the charge packets into the Vertical Charge-Coupled Devices (VCCDs) or charge-to-voltage conversion regions. In some embodiments in accordance with the invention, another integration period for the pixels that transferred charge packets is initiated after the transfer is complete. Charge packets can be binned during readout of the images.

The integration period for one field of pixels can be started or finished independently from the other fields of pixels. Multiple images can then be captured with different fields of pixels and the charge packets temporarily stored in the VCCDs (for a CCD image sensor), in the charge-to-voltage conversion regions for a CMOS image sensor, or in the photosensitive areas so that the respective integration periods overlap. By using images that are spatially overlapped on the image sensor, the alignment of the multiple images is made easier. The motion of an object in a scene being imaged can be easily determined by capturing multiple images with long and short integration periods, and by capturing some of the images in rapid succession. For example, motion can be determined by comparing the location of objects in the images captured in rapid succession. Improved images with reduced motion blur in scenes with low light and rapid motion can be produced by combining the multiple images.

In one embodiment in accordance with the invention, multiple images are captured by an image sensor having an array of pixels with each pixel including a photosensitive area, vertical charge coupled devices (VCCDs) each including charge storage elements and positioned adjacent to respective columns of pixels, transfer mechanisms for transferring charge packets from the photosensitive areas to respective charge storage elements in the VCCDs, and a horizontal charge coupled device (HCCD) that includes charge storage elements. Initially, light integration for all of the pixels begins and the photosensitive areas accumulate charge packets. Charge packets from all of the pixels are transferred to respective charge storage elements in the VCCDs at a first time, where the charge packets from the pixels have a first integration period. The charge packets in the VCCDs are binned by shifting a portion of the charge packets one or more charge storage element in each VCCD. Light integration then ends for all of the pixels. Charge packets from a first portion of pixels are transferred to respective charge storage elements in the VCCDs at a second time, where the charge packets from the first portion of pixels have a second integration period that is different from the first integration period. One line of charge packets are transferred from the VCCDs into respective charge storage elements in the HCCD and the charge packets shifted one or more charge storage element within the HCCD. Charge packets are then binned in the HCCD by transferring another line of charge packets from the VCCDs into respective charge storage elements in the HCCD. The charge packets are read out of the HCCD.

BRIEF DESCRIPTION OF THE DRAWINGS

Embodiments of the invention are better understood with reference to the following drawings. The elements of the drawings are not necessarily to scale relative to each other.

FIGS. 21A-21F are graphical illustrations of some of the blocks shown in FIG. 20;

DETAILED DESCRIPTION

Figure 1:
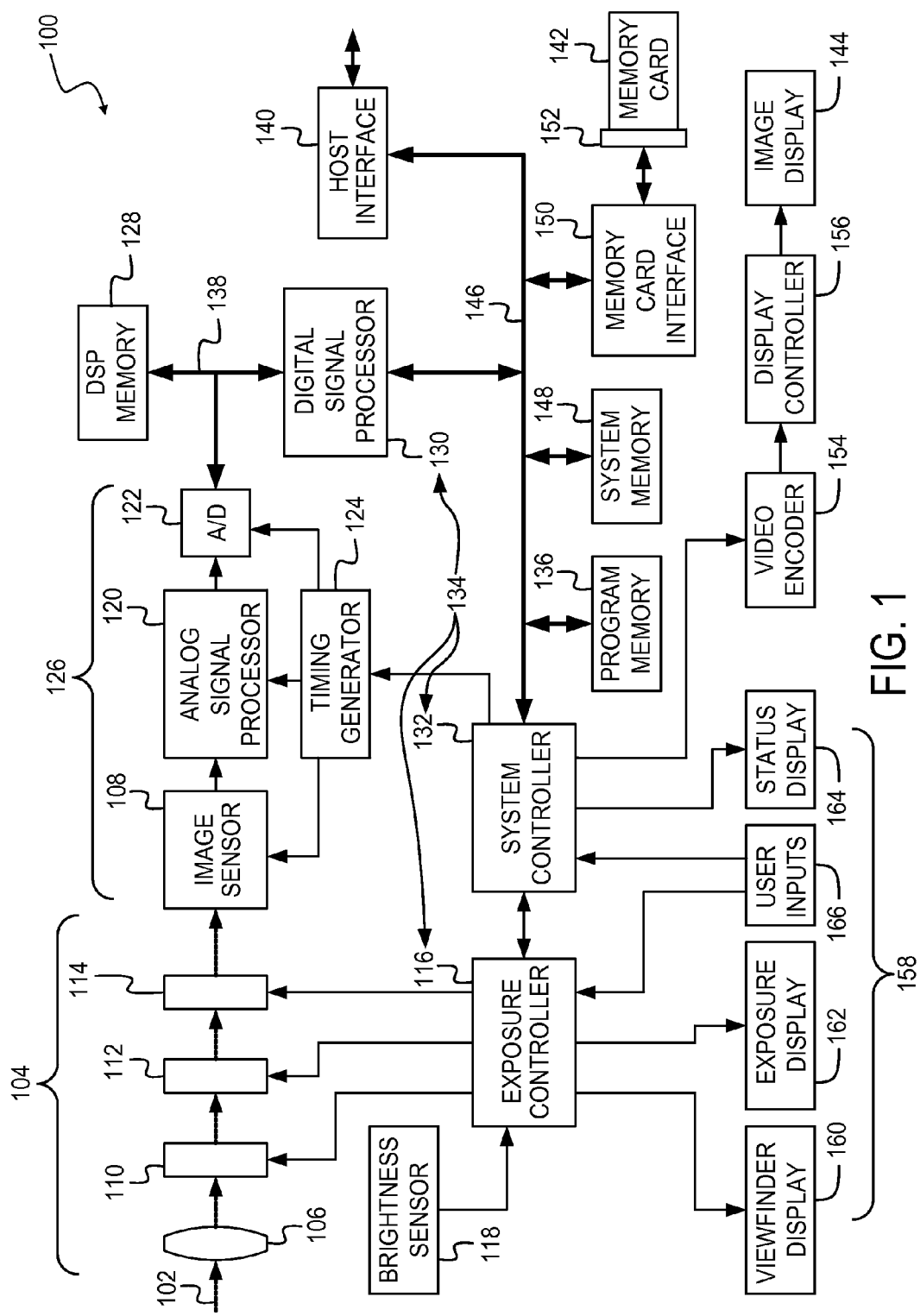
FIG. 1 is a block diagram of an image capture device in an embodiment in accordance with the invention.

The invention describes methods for operating an image sensor to capture multiple images where the exposure times for some of the images overlap and the images are spatially overlapped as captured on the image sensor. One or more embodiments in accordance with the invention use the transfer of charge packets from one or more portions of the pixels after a first integration period to effectively reset these pixels. This enables the portion or portions of pixels to begin a second integration period. After the transfer of charge packets from the one or more portions of pixels, one or more other portions of pixels continue integrating charge, thereby producing charge packets with different integration periods. The charge packets from different portions of pixels are temporarily stored in the photosensitive areas or in respective charge storage elements or shift elements within the VCCDs to enable multiple images to be captured with overlapping and non-overlapping exposure periods before readout. Comparison of two or more images where the images have different lengths of overlapping or non-overlapping exposure periods provides information on the motion that is occurring within the scene that is being photographed, as well as information on the movement of the image capture device relative to the scene. By capturing multiple images with overlapped exposure periods from portions of the pixels on the same image sensor, the multiple images are at least partially aligned spatially and aligned within time so that the image data and motion information is consistent.

The portions of pixels can be sparsely distributed across the image sensor, arranged by rows or columns on the image sensor, or arranged in a checkerboard fashion across the image sensor. Comparison between multiple images to determine motion can be done between images captured with the same portions of pixels or since the different portions of pixels are spatially overlapped on the image sensor, images captured with different portions of pixels can be compared. This motion information can be used to produce improved images with reduced motion blur, improved color balance, reduced noise, enhanced dynamic range, and enhanced flash control.

The terms exposure period and integration period are used somewhat interchangeably in the digital photography art. In general, the term exposure period refers to the period of time associated with gathering image data from a scene in a digital image. Alternately, the term integration period refers to the period of time that a pixel or group of pixels gather photo-generated charge.

In digital image capture devices, such as a digital camera, an image is captured by converting the light from a scene into electronic signals at the photosensitive areas of a solid-state charge coupled device (CCD) image sensor or a Complimentary Metal Oxide Semiconductor (CMOS) image sensor. The amount of signal generated by the image sensor depends on the amount of light that falls on the image sensor, in terms of both intensity and duration. Therefore, digital image capture devices require some form of shutter to control exposure. This is typically achieved either by using a mechanical shutter in front of the image sensor or by using an electronic shutter on the image sensor.

For digital capture devices equipped with a CCD image sensor and a mechanical shutter, the integration period or exposure time depends on the duration of the opening of the mechanical shutter, the time between the reset of the photosensitive areas in the pixels, and the transfer of the charge packets from the photosensitive areas into the VCCDs. In some situations, such as with video capture, an electronic shutter is used and the integration period is typically determined solely by the time between the reset of the photosensitive areas and the transfer of the charge packets from the photosensitive areas into the VCCDs.

When the scene is illuminated by a low amount of light or there is rapid motion within the scene, it is advantageous to capture multiple images with short exposure times to reduce motion blur within each image. The multiple images can then be aligned to compensate for motion between the images and assembled into a combined image with an improved signal to noise ratio and reduced motion blur. The multiple images can be combined, for example, by a processor, an analog or digital signal processor, or a computing device.

To further improve the signal to noise ratio, a long exposure image can be combined with the multiple short exposure images to produce an improved combined image. This approach reduces noise in two ways; the long exposure image inherently has low noise while the combined series of short exposure images averages out much of the noise that is present in a single short exposure image and each single short exposure image has reduced motion blur. To make it easier to adjust or align the multiple images to compensate for the motion within the scene, it is advantageous to provide some of the multiple images with temporally overlapping exposure times. An example of temporally overlapping exposure times would be to capture a series of short exposure images within the same time as a single long exposure image. Temporally overlapping exposure times provide shared motion between images even when they have different lengths of exposure. As such, at least some of the image data is shared between the multiple images even if rapid motion is present in the scene.

One technique for combining overlapping images is disclosed in co-pending U.S. patent application Ser. No. 12/258,389 filed on Oct. 25, 2008. Co-pending U.S. patent application Ser. No. 11/780,841, filed on Jul. 20, 2007, discloses techniques for determining the motion present during the capture of the multiple captures. The motion can be caused by camera shake or movement of objects in the scene. The degree of motion and direction of motion can be determined as described in U.S. patent application Ser. No. 11/780,841. The determined motion can be used to help align the multiple short exposure images to reduce motion blur in a combined image. The determined motion can also be used to define a point spread function for the long exposure image so that motion blur can be reduced through sharpening, deblurring or deconvolution as is well known in the art. Both of these patent applications are incorporated herein by reference.

Turning now to FIG. 1, there is shown a block diagram of an image capture device in an embodiment in accordance with the present invention. Image capture device 100 is implemented as a digital camera in FIG. 1, but the present invention is applicable to other types of image capture devices. Examples of different types of image capture device include, but are not limited to, a scanner, a digital video camera, and mobile or portable devices that include one or more cameras.

Light 102 from the subject scene is input to an imaging stage 104, where the light is focused by lens 106 to form an image on image sensor 108. Image sensor 108 converts the incident light to an electrical signal for each picture element (pixel). Image sensor 108 is implemented as a charge coupled device (CCD) image sensor in an embodiment in accordance with the invention. Image sensor 108 can be configured differently in other embodiments in accordance with the invention. For example, image sensor 108 can be implemented as a Complementary Metal Oxide Semiconductor (CMOS) image sensor.

Pixels on image sensor 108 typically have a color filter array (CFA) (not shown) applied over the pixels so that each pixel senses a portion of the imaging spectrum. Examples of red, green and blue CFA patterns of pixels are shown in FIGS. 7, 9, 11, 13-15, 17, 19, 21-23, 25, and 27, although different patterns and different color combinations such as cyan, magenta and yellow, or red, green, blue, and panchromatic can be used in other embodiments in accordance with the invention.

The light passes through lens 106 and filter 110 before being sensed by image sensor 108. Optionally, the light passes through a controllable iris 112 and mechanical shutter 114. Filter 112 comprises an optional neutral density (ND) filter for imaging brightly lit scenes. The exposure controller block 116 responds to the amount of light available in the scene as metered by the brightness sensor block 118 and regulates the operation of filter 110, iris 112, shutter 114, and the integration period (or exposure time) of image sensor 108 to control the brightness of the image as sensed by image sensor 108. Image sensor 108, iris 112, shutter 114, exposure controller 116, and brightness sensor 118 form an autoexposure system in one embodiment in accordance with the invention.

This description of a particular camera configuration will be familiar to one skilled in the art, and it will be obvious that many variations and additional features are present. For example, an autofocus system is added, or the lenses are detachable and interchangeable. It will be understood that the present invention is applied to any type of digital camera, where similar functionality is provided by alternative components. For example, the digital camera can be a relatively simple point and shoot digital camera, where shutter 114 is a relatively simple movable blade shutter, or the like, instead of a more complicated focal plane arrangement as is found in a digital single lens reflex camera. The present invention can also be practiced on imaging components included in simple camera devices such as mobile phones and automotive vehicles which can be operated without controllable irises 112 and without mechanical shutters 114. Lens 106 can be a fixed focal length lens or a zoom lens.

The analog signal from image sensor 108 is processed by analog signal processor 120 and applied to analog to digital (A/D) converter 122. Timing generator 124 produces various clocking signals to select rows and pixels, to transfer charge packets out of image sensor 108, and synchronize the operation of analog signal processor 120 and A/D converter 122. The image sensor stage 126 includes image sensor 108, analog signal processor 120, A/D converter 122, and timing generator 124. The components of image sensor stage 126 are separately fabricated integrated circuits, or they are fabricated as a single integrated circuit as is commonly done with CMOS image sensors. The resulting stream of digital pixel values from A/D converter 122 is stored in memory 128 associated with digital signal processor (DSP) 130.

Digital signal processor 130 is one of three processors or controllers in this embodiment, in addition to system controller 132 and exposure controller 116. Although this partitioning of camera functional control among multiple controllers and processors is typical, these controllers or processors are combined in various ways without affecting the functional operation of the camera and the application of the present invention. These controllers or processors can comprise one or more digital signal processor devices, microcontrollers, programmable logic devices, or other digital logic circuits. Although a combination of such controllers or processors has been described, it should be apparent that one controller or processor can be designated to perform all of the needed functions. All of these variations can perform the same function and fall within the scope of this invention, and the term "processing stage" will be used as needed to encompass all of this functionality within one phrase, for example, as in processing stage 134 in FIG. 1.

In the illustrated embodiment, DSP 130 manipulates the digital image data in memory 128 according to a software program permanently stored in program memory 136 and copied to memory 128 for execution during image capture. DSP 130 executes the software necessary for practicing the image processing of the invention. Memory 128 includes any type of random access memory, such as SDRAM. Bus 138 comprising a pathway for address and data signals connects DSP 130 to memory 128, A/D converter 122, and other related devices.

System controller 132 controls the overall operation of the camera based on a software program stored in program memory 136, which can include Flash EEPROM or other nonvolatile memory. This memory can also be used to store image sensor calibration data, user setting selections and other data which must be preserved when the camera is turned off. System controller 132 controls the sequence of image capture by directing exposure controller 116 to operate lens 106, filter 110, iris 112, and shutter 114 as previously described, directing the timing generator 124 to operate image sensor 108 and associated elements, and directing DSP 130 to process the captured image data. After an image is captured and processed, the final image file stored in memory 128 is transferred to a computer via host interface 140, stored on a removable memory card 142 or other storage device, and displayed for the user on image display 144.

Bus 146 includes a pathway for address, data and control signals, and connects system controller 132 to DSP 130, program memory 136, system memory 148, host interface 140, memory card interface 150, and other related devices. Host interface 140 provides a high speed connection to a personal computer (PC) or other host computer for transfer of image data for display, storage, manipulation or printing. This interface is an IEEE 1394 or USB2.0 serial interface or any other suitable digital interface. Memory card 142 is typically a Compact Flash (CF) card inserted into socket 152 and connected to the system controller 132 via memory card interface 150. Other types of storage that are utilized include without limitation PC-Cards, MultiMedia Cards (MMC), or Secure Digital (SD) cards.

Processed images are copied to a display buffer in system memory 148 and continuously read out via video encoder 154 to produce a video signal. This signal is output directly from the camera for display on an external monitor, or processed by display controller 156 and presented on image display 144. This display is typically an active matrix color liquid crystal display (LCD), although other types of displays are used as well.

The user interface 158, including all or any combination of viewfinder display 160, exposure display 162, status display 164, image display 144, and user inputs 166, is controlled by a combination of software programs executed on exposure controller 116 and system controller 132. User inputs 166 typically include some combination of buttons, rocker switches, joysticks, rotary dials or touch screens. Exposure controller 116 operates light metering, exposure mode, autofocus and other exposure functions. System controller 132 manages the graphical user interface (GUI) presented on one or more of the displays, e.g., on image display 144. The GUI typically includes menus for making various option selections and review modes for examining captured images.

Exposure controller 116 accepts user inputs selecting exposure mode, lens aperture, exposure time (shutter speed), and exposure index or ISO speed rating and directs the lens and shutter accordingly for subsequent captures. Optional brightness sensor 118 is employed to measure the brightness of the scene and provide an exposure meter function for the user to refer to when manually setting the ISO speed rating, aperture and shutter speed. In this case, as the user changes one or more settings, the light meter indicator presented on viewfinder display 160 tells the user to what degree the image will be over or underexposed. In an alternate case, brightness information is obtained from images captured in a preview stream for display on the image display 144. In an automatic exposure mode or with an autoexposure system, the user changes one setting and the exposure controller 116 automatically alters another setting to maintain correct exposure, e.g., for a given ISO speed rating when the user reduces the lens aperture, the exposure controller 116 automatically increases the exposure time to maintain the same overall exposure. In a fully automatic mode or with an autoexposure system, the user selects the fully automatic mode and the image capture device determines the settings for image capture based on measurements of the scene.

The foregoing description of a digital camera will be familiar to one skilled in the art. It will be obvious that there are many variations of this embodiment that are possible and are selected to reduce the cost, add features or improve the performance of the camera.

The image sensor 108 shown in FIG. 1 typically includes a two-dimensional array of pixels each having a photosensitive area fabricated on a silicon substrate that provides a way of converting incoming light at each pixel into an electrical signal that is measured. The pixels are arranged on the image sensor in lines comprised of rows and columns. As the sensor is exposed to light, free charge carriers are generated and captured within the electronic structure at each pixel. Capturing these free charge carriers or photo-generated charge packets for some period of time and then measuring the number of carriers captured, or measuring the rate at which free charge carriers are generated measures the light level at each pixel. In the former case, accumulated charge packets are shifted out of the array of pixels to a charge to voltage measurement circuit as in a CCD image sensor.

Figure 2:
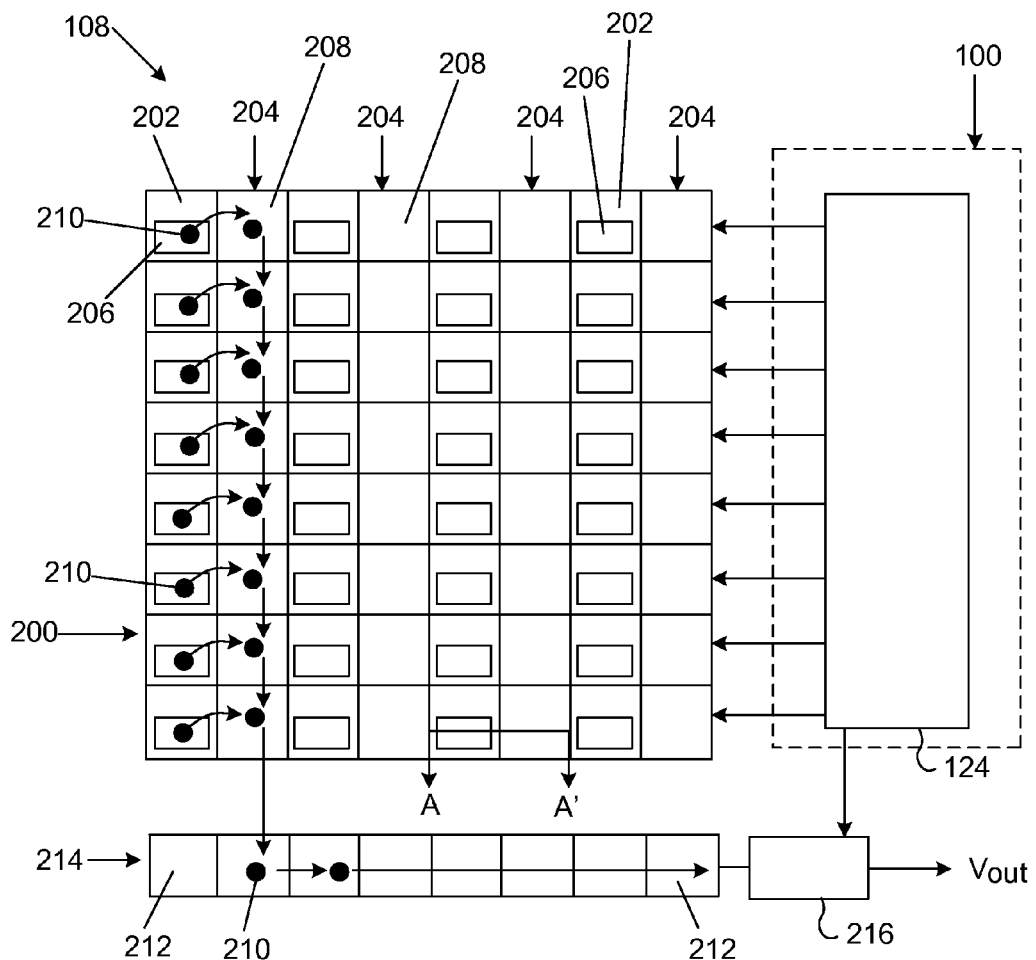
FIG. 2 illustrates a top view of a Charge-Coupled Device (CCD) image sensor that can be used as image sensor 108 in FIG. 1 in an embodiment in accordance with the invention.

FIG. 2 illustrates a top view of a Charge-Coupled Device (CCD) image sensor that can be used as image sensor 108 in FIG. 1 in an embodiment in accordance with the invention. Image sensor 108 includes an imaging area 200 having a two-dimensional array of pixels 202 and a vertical charge-coupled device (VCCD) shift register 204 adjacent to each column of pixels. Each pixel 202 includes one or more photosensitive areas 206. Each VCCD shift register 204 includes a column of charge storage elements 208, with one or more charge storage elements associated with each pixel in a column of pixels.

Photo-generated charge packets 210 accumulate in each photosensitive area 206 in response to light striking the imaging area 200 over an integration period. To read out an image captured by image sensor 108, appropriate bias voltage signals are generated by timing generator 124 (see FIG. 1) and applied to transfer regions or gates (not shown) disposed between the photosensitive areas 206 and respective charge storage elements 208. This causes the charge packets 210 to transfer from the photosensitive areas 206 to respective charge storage elements 208. The charge packets 210 in all of the VCCDs 204 within the same field are then shifted in parallel during readout, one row at a time into charge storage elements 212 in horizontal CCD (HCCD) shift register 214. Each row of charge packets 210 is then shifted serially one charge storage element 212 at a time through HCCD shift register 214 to output circuit 216. Output circuit 216 converts the charge packets 210 collected by each photosensitive area 206 into an analog voltage output signal ($V_{out}$) that is output from output circuit 216.

Figure 3:
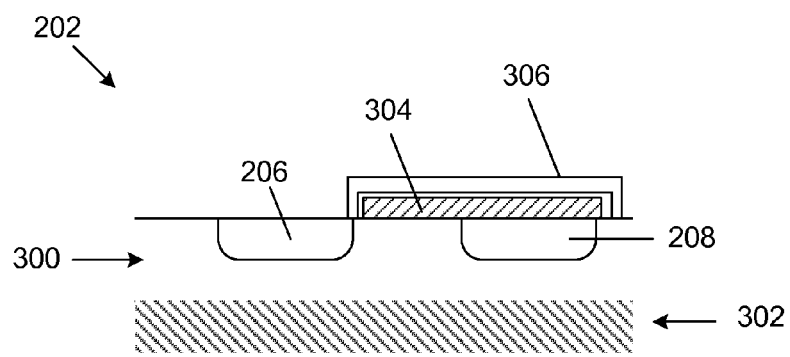
FIG. 3 is a cross-sectional view along line A-A' in FIG. 2 in an embodiment in accordance with the invention.

Referring now to FIG. 3, there is shown a cross-sectional view along line A-A' in FIG. 2 in an embodiment in accordance with the invention. Pixel 202 includes photosensitive area 206 and charge storage element 208 formed in layer 300. Layer 300 is disposed over substrate 302. Transfer gate 304 is electrically pulsed to transfer charge packets from photosensitive area 206 to charge storage element 208. The VCCD that includes charge storage element 208 is then clocked to transfer the charge packets to a HCCD. The VCCDs are partially shielded from light by partially opaque layer 306, also known as a light shield.

Substrate 302 can be pulsed at an appropriate voltage level for clearing charge out of the photosensitive areas and into substrate 302 when layer 300 is configured as a vertical overflow drain. This process is also known as a reset operation. The vertical overflow drain allows for a global reset to be performed on all of the pixels in the imaging area. The global reset disposes of any residual charge in all photosensitive areas 206.

Figure 4:
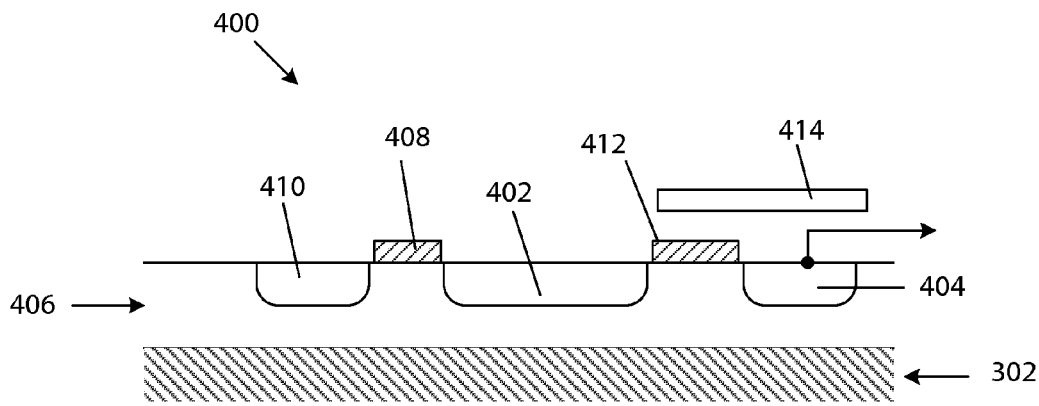
FIG. 4 is a cross-sectional view of a pixel that is included in a Complementary Metal Oxide Semiconductor (CMOS) image sensor that can be used as image sensor 108 in FIG. 1 in an embodiment in accordance with the invention.

FIG. 4 is a cross-sectional view of a pixel that is included in a Complementary Metal Oxide Semiconductor (CMOS) image sensor that can be used as image sensor 108 in FIG. 1 in an embodiment in accordance with the invention. Pixel 400 includes photosensitive area 402 and charge-to-voltage conversion region 404 formed in layer 406. The pixels in a CMOS image sensor are individually addressable for reading out the charge packets using techniques that are well known in the art. For clearing charge before image capture, drain transfer gate 408 is electrically pulsed to transfer charge to drain 410. This reduces undesirable image artifacts from forming in an image because the residual charge is disposed of prior to image capture.

After image capture, the charge packet accumulated in photosensitive area 402 is transferred by transfer gate 412 to charge-to-voltage conversion region 404. Charge-to-voltage conversion region 404 is shielded from light by opaque layer 414. An amplifier transistor (not shown) is connected to charge-to-voltage conversion region 404 to output a voltage signal from pixel 400. The techniques described herein for reading out image data can be used with a CCD or a CMOS image sensor.

Figure 5:
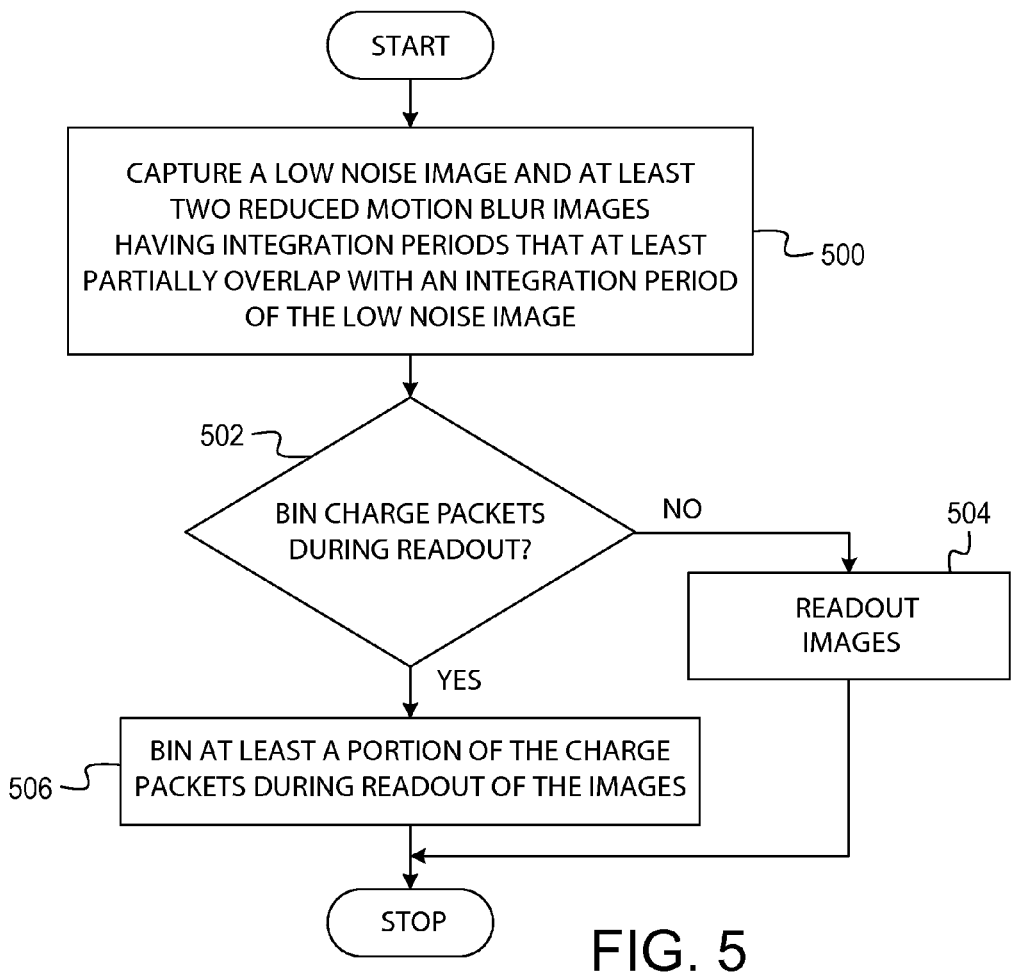
FIG. 5 is a flowchart of a method for capturing multiple images in an embodiment in accordance with the invention.

Referring now to FIG. 5, there is shown a flowchart of a method for capturing multiple images in an embodiment in accordance with the invention. Initially, a low noise image and at least two reduced motion blur images are captured (block 500). As used herein, a low noise image has a longer charge integration period than a reduced motion blur image. The two or more reduced motion blur images each have an integration period that at least partially overlaps with an integration period of the low noise image. The integration periods of the reduced motion blur images may, or may not, at least partially overlap each other.

Once the multiple images (i.e., the low noise and two or more reduced motion blur images) are captured, a determination is made at block 502 as to whether or not at least a portion of the charge packets are to be summed together or binned during readout of the images. If not, the method passes to block 504 where the images are readout without charge binning. If charge packets are to be binned, the process continues at block 506 where at least some of the charge packets are binned during image readout.

Various techniques for capturing a low noise image and at least two reduced motion blur images are described in FIGS. 6, 8, 10, 12, and 16. Additionally, several methods for binning charge during image readout are disclosed in FIGS. 18, 20, 24, and 26.

Figure 6:
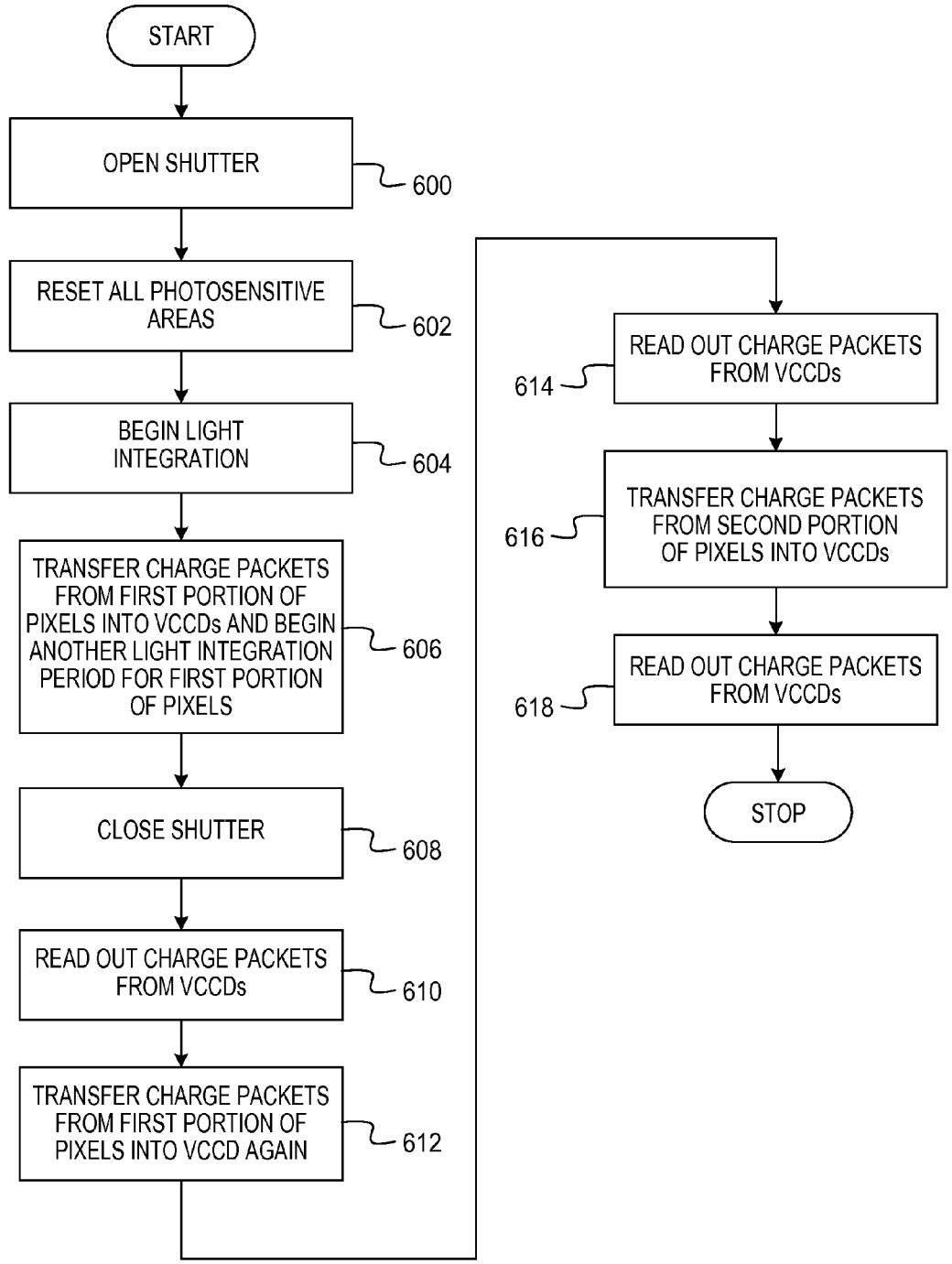
FIG. 6 is a flowchart of a first method for capturing and reading out multiple images in an embodiment in accordance with the invention.

FIG. 6 depicts a flowchart of a first method for capturing and reading out multiple images in an embodiment in accordance with the invention. The method shown in FIG. 6 will be described with reference to FIGS. 7A-7H. Initially, a mechanical shutter is opened, as shown in block 600. For example, mechanical shutter 114 is opened in the embodiment shown in FIG. 1. A mechanical shutter is used in one or more embodiments in accordance with the invention to reduce an image defect known as smear. Smear is caused by light leaking into the VCCDs in bright areas of the image during readout of the charge packets from the VCCDs to the HCCD, thereby corrupting the charge packets and causing bright linear image defects. By closing a mechanical shutter 114 during readout of the VCCD, the image sensor 108 is in darkness during readout and smear is reduced. Other embodiments in accordance with the invention can utilize an electronic shuttering operation instead of a mechanical shutter.

Next, as shown in block 602, all of the photosensitive areas are reset. As discussed earlier, one or more electrical pulses are applied to the substrate to clear all the photosensitive areas of charge in one embodiment in accordance with the invention. The photosensitive areas then accumulate charge during light integration (block 604). Block 604 is illustrated in FIG. 7A.

Figure 7A:
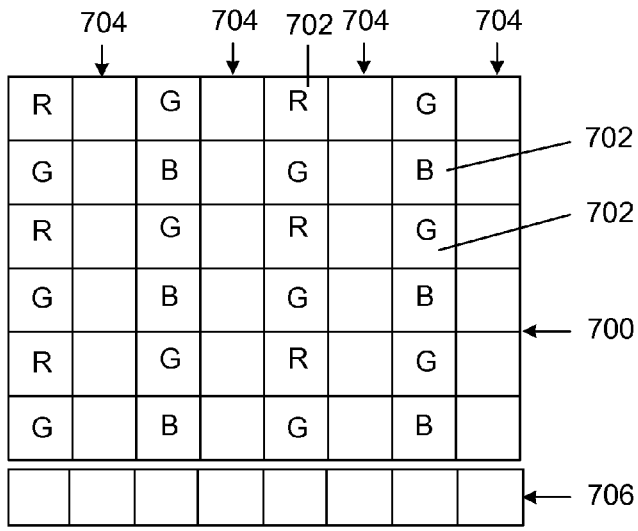
FIGS. 7A-7H are graphical illustrations of some of the blocks shown in FIG. 6.

FIG. 7A depicts a top view of a CCD image sensor having an array 700 of pixels 702, columns of VCCDs 704, and a HCCD 706. Each pixel 702 is shown with a color filter element overlying the pixel. In the embodiment of FIG. 7, the CFA is configured as the well known Bayer CFA pattern that includes color filter elements that filter light propagating in the red (R), green (G), and blue (B) wavelength ranges. While FIG. 7 is shown with the Bayer CFA pattern, any CFA pattern can be used in other embodiments in accordance with the invention. The CFA pattern can include a repeating pattern of color filter elements, where the repeating pattern is defined by the color filter elements in a single row of pixels, in two adjacent rows of pixels, or in multiple rows of pixels. Exemplary repeating CFA patterns are depicted in FIGS. 13-15 and 17.

After a predetermined amount of time has passed (the end of a first integration period), the accumulated charge packets in a first portion of the pixels in the imaging area are transferred to respective charge storage elements in each VCCD and another integration period begins for these pixels (block 606). Transferring the charge packets from the first portion of pixels into respective charge storage elements in the VCCDs effectively resets the photosensitive areas in the first portion of pixels, so that a second image can be captured using the same pixels without having to wait for the charge packets in the first image to be readout from the VCCDs.

Figure 7B:
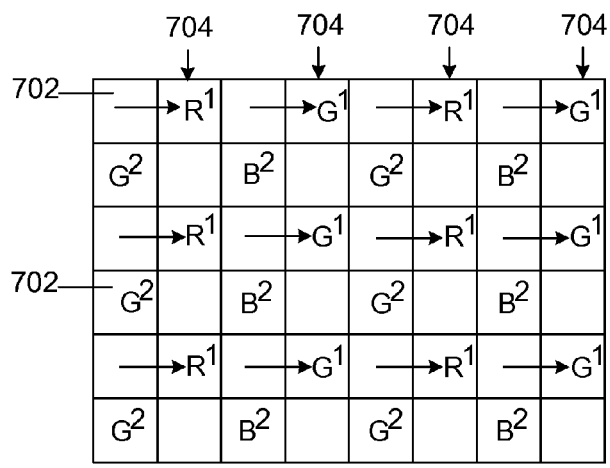

By way of example only, the first portion of pixels includes all of the odd numbered rows of pixels in an embodiment in accordance with the invention, as illustrated in FIG. 7B. To illustrate the different integration periods within the different images that are captured in accordance with the invention, superscripts have been added to the figures that illustrate charge packet transfers including FIGS. 7, 9, 11, 19, 21, 22, 23, 25, and 27. The superscript numeral represents an integration period, with the number "1" signifying the first integration period. The charge packets in the pixels 702 that did not transfer charge to the VCCDs 704 continue to accumulate charge and have a second, longer integration period. This second integration period is represented by the superscript "2".

After another predetermined amount of time has passed (the end of the second integration period), the mechanical shutter is closed (block 608) to prevent the photosensitive areas from accumulating more photo-generated charge. Closing the shutter prior to image readout reduces the amount of light that falls onto the VCCDs during readout so that smear is reduced in the captured image or images.

Figure 7C:
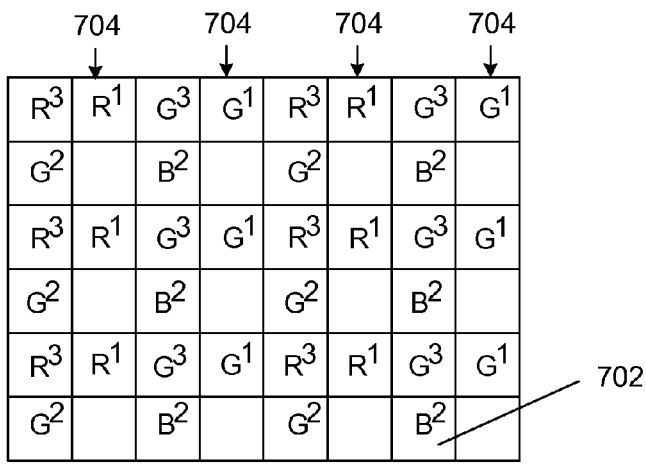

FIG. 7C depicts the array 700 after the mechanical shutter is closed. At this point, the charge packets in the VCCDs 704 have a first integration period (represented by the superscript 1), the charge packets in the photosensitive areas in the pixels not included in the first portion of pixels have the longer second integration period (represented by the superscript 2), and the newly accumulated charge packets in the photosensitive areas in the first portion of pixels have a different third integration period (represented by the superscript 3). The third integration period is substantially equal to the second integration period minus the first integration period.

Figure 7D:
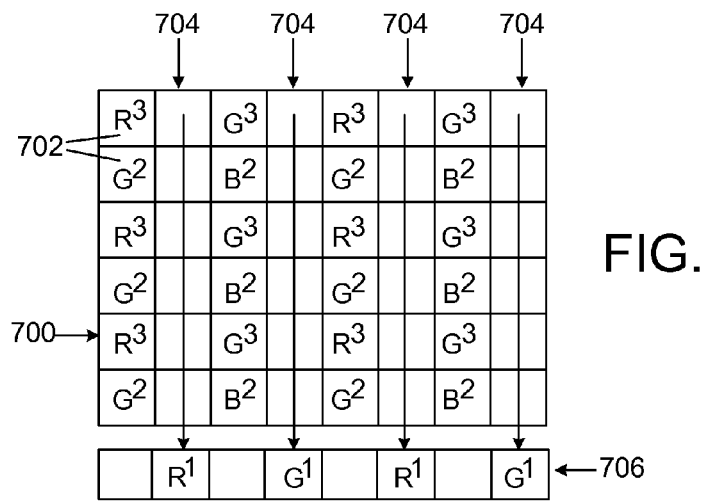
Figure 7E:
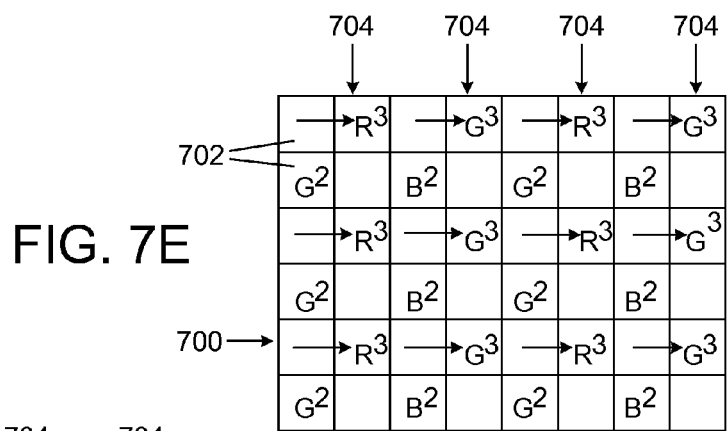
Figure 7F:
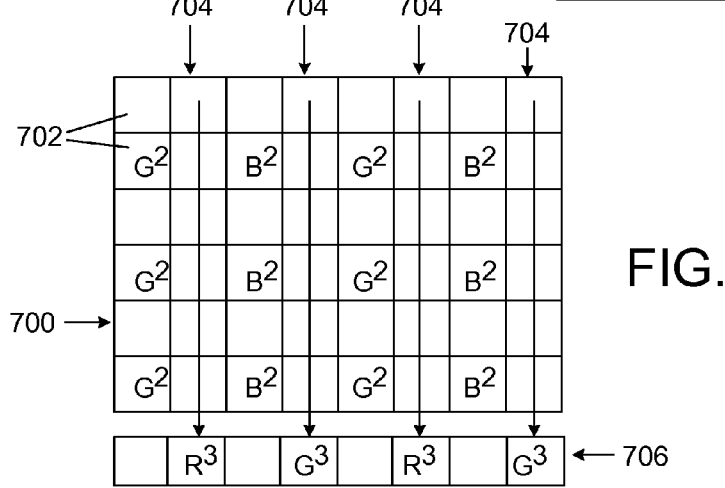

The charge packets are then read out of the VCCDs at block 610. FIG. 7D illustrates the image sensor after the charge packets are read out of the VCCDs 704. Next, as shown in block 612, the charge packets in the first portion of pixels in the array 700 having the third integration period are transferred to respective charge storage elements in the VCCDs 704. This block is depicted in FIG. 7E. The charge packets in the VCCDs 704 are then read out of the VCCDs (block 614 and FIG. 7F).

Figure 7G:
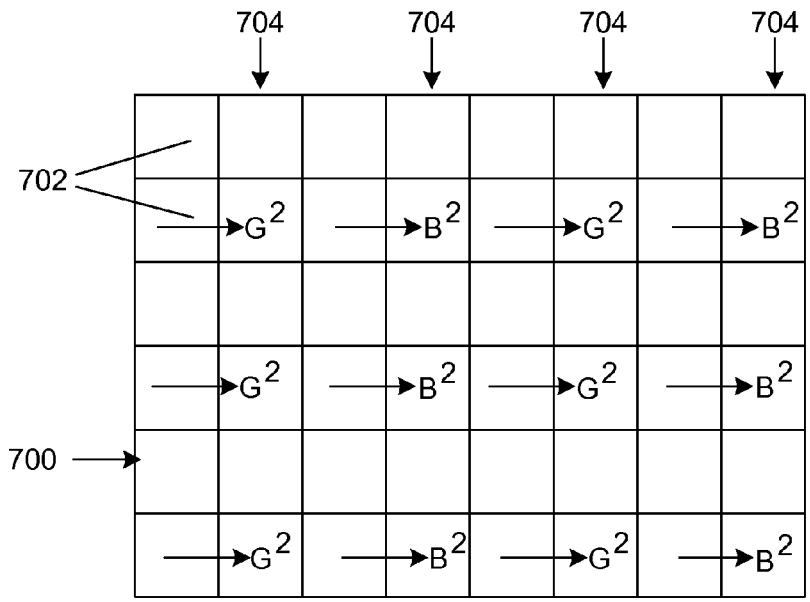
Figure 7H:
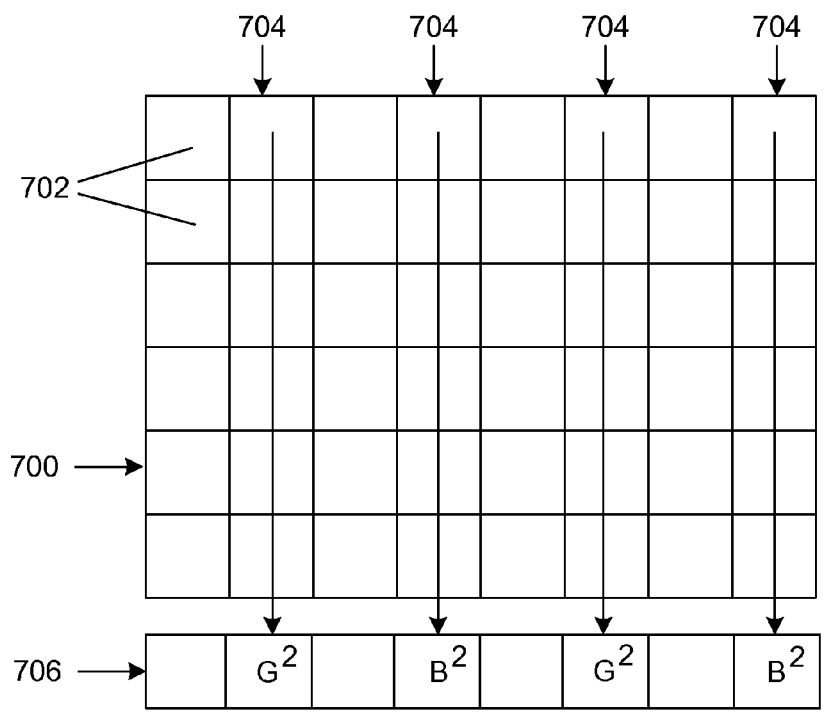

The charge packets in the pixels not included in the first portion of pixels are transferred to the VCCDs 704 and read out of the image sensor, as shown in blocks 616 and 618. These two blocks are illustrated in FIGS. 7G and 7H, respectively. The method of FIG. 6 then ends. Other embodiments in accordance with the invention can repeat the method of FIG. 6 a given number of times.

The method of FIG. 6 and the image sensor shown in FIGS. 7A-7H use a two field interlaced readout of alternating rows of pixels. In the FIG. 7 embodiment, the first field includes the odd numbered rows while the second field includes the even numbered rows, and the charge packets in pixels in the odd numbered rows are readout of the entire image sensor before the even numbered rows of pixels are readout. Thus, the method of FIG. 6 produces three captured images: two sequential images with shorter integration periods (the first and third integration periods) from the first field, also known as the reduced motion blue images, and one overlapping image with the second integration period (the low noise image) from the second field. The interlaced readout of the image sensor allows VCCDs to be used with effectively one-half ($\frac{1}{2}$) the number of shift elements as the number of rows in the image sensor.

Figure 8:
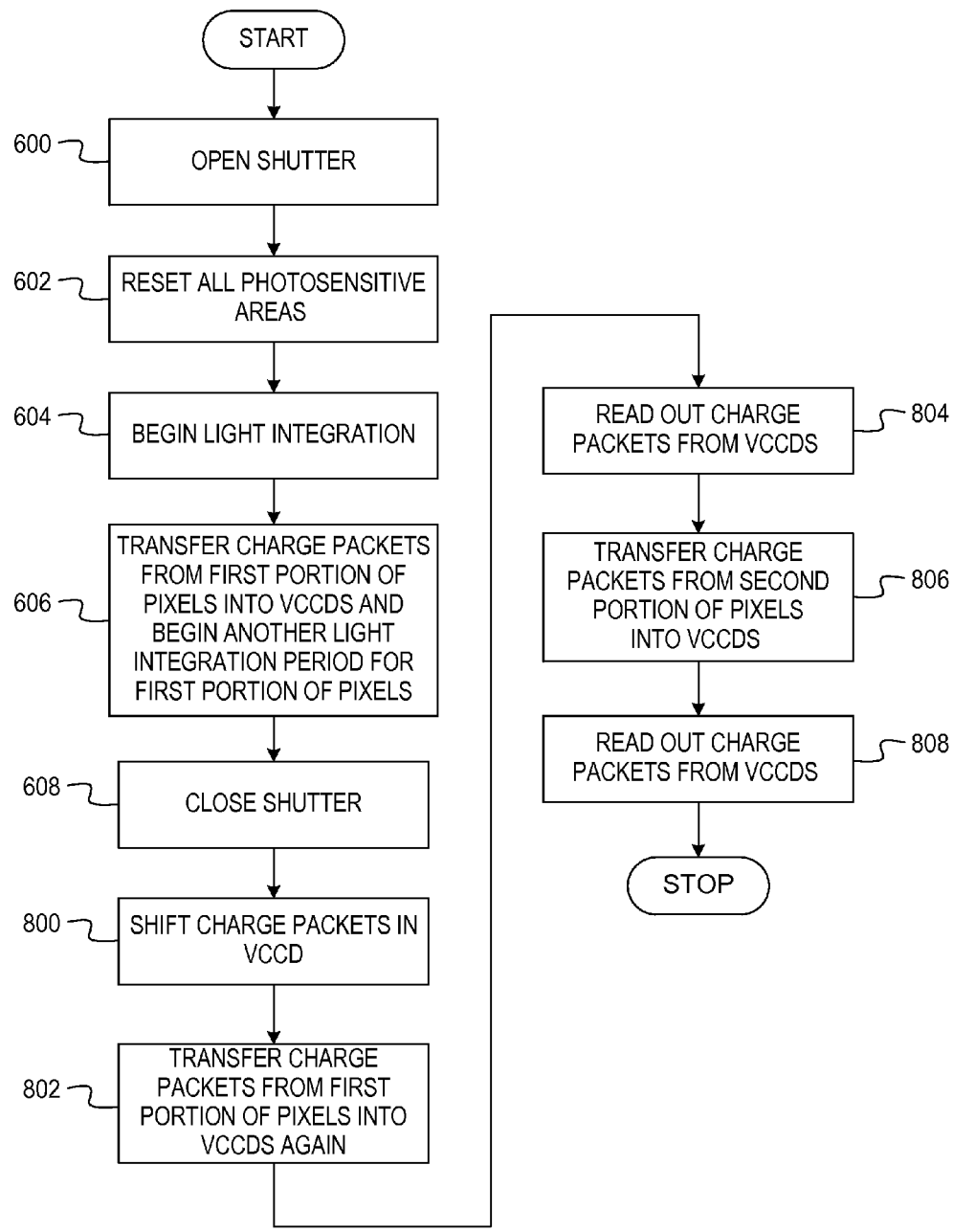
FIG. 8 is a flowchart of a second method for capturing and reading out multiple images in an embodiment in accordance with the invention.

Referring now to FIG. 8, there is shown a flowchart of a second method for capturing and reading out multiple images in an embodiment in accordance with the invention. The second method includes two fields of pixels and uses a progressive readout. Because the method uses two fields of pixels, the integration period for the first field of pixels (i.e., a first portion of pixels) can be selected to be different from the integration period for the second field of pixels.

Additionally, progressive readout means the image sensor reads out the charge packets from both the first portion of pixels (e.g., odd numbered rows) and the second portion of pixels (e.g., even numbered rows) together in the VCCDs. With progressive readout, the VCCDs have the same number of charge storage elements as there are rows and the charge packets can be transferred from the photosensitive areas into respective charge storage elements in the VCCDs at different times for the first and second fields and first and second portions of pixels prior to readout from the VCCDs.

Blocks 600, 602, 604, 606, 608 in FIG. 8 are the same blocks as those shown in FIG. 6. FIGS. 7A through 7C illustrate blocks 604, 606, 608, respectively. Some of the blocks shown in FIG. 8 will be described with reference to FIGS. 9A-9F, with FIG. 9A following FIG. 7C.

Figure 9A:
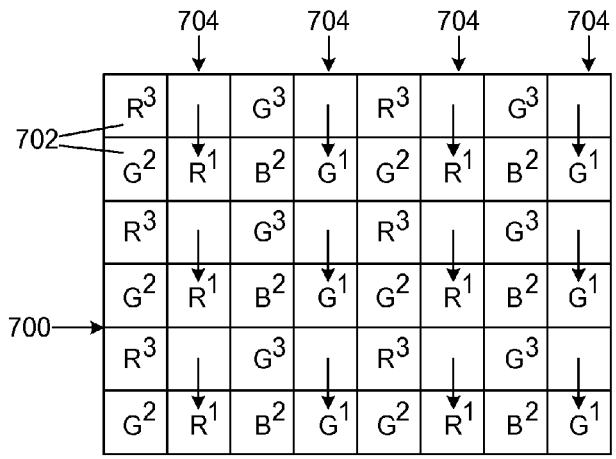
FIGS. 9A-9E are graphical illustrations of some of the blocks shown in FIG. 8.

After the shutter is closed (block 608), the charge packets in the VCCDs 704 are shifted one or more charge storage elements within the VCCDs 704 (block 800). The charge packets can be shifted up or down within the VCCDS 704, and the charge packets are shifted so that each charge storage element that received a charge packet from a pixel in the first portion of pixels is now empty. For example, the charge packets are shifted down one row, as shown in FIG. 9A in an embodiment in accordance with the invention. At this point, the charge packets in the VCCDs 704 have a first integration period (represented by the superscript 1), the charge packets in the photosensitive areas in the pixels not included in the first portion of pixels have a longer second integration period (represented by the superscript 2), and the newly accumulated charge packets in the photosensitive areas in the first portion of pixels have a different third integration period (represented by the superscript 3). The third integration period is substantially equal to the second integration period minus the first integration period.

Figure 9B:
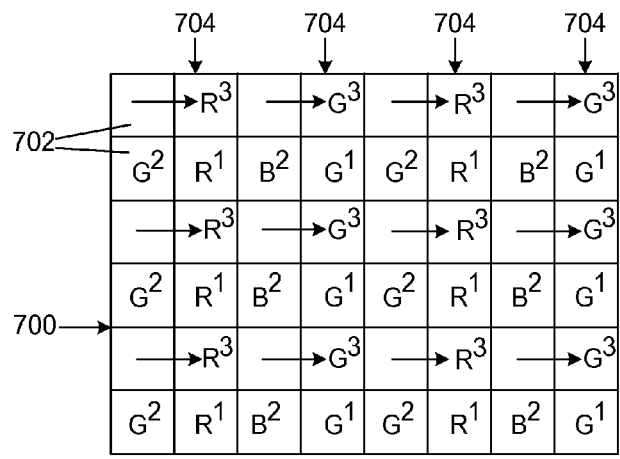
Figure 9C:
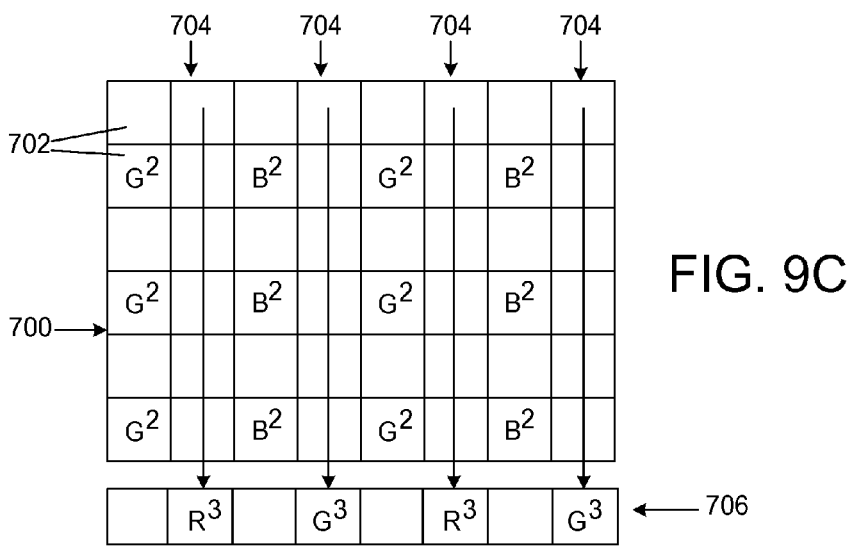

Next, as shown in block 802, the newly accumulated charge packets in the first portion of pixels are transferred to respective charge storage elements in the VCCDs 704. This block is depicted in FIG. 9B. At this point, the charge packets from two sequentially captured images from the first portion of pixels are stored by alternating rows within the VCCDs, with the two sequentially captured images having different exposure periods. The charge packets in the VCCDs 704 are then read out of the VCCDs (block 804 and FIG. 9C).

Figure 9D:
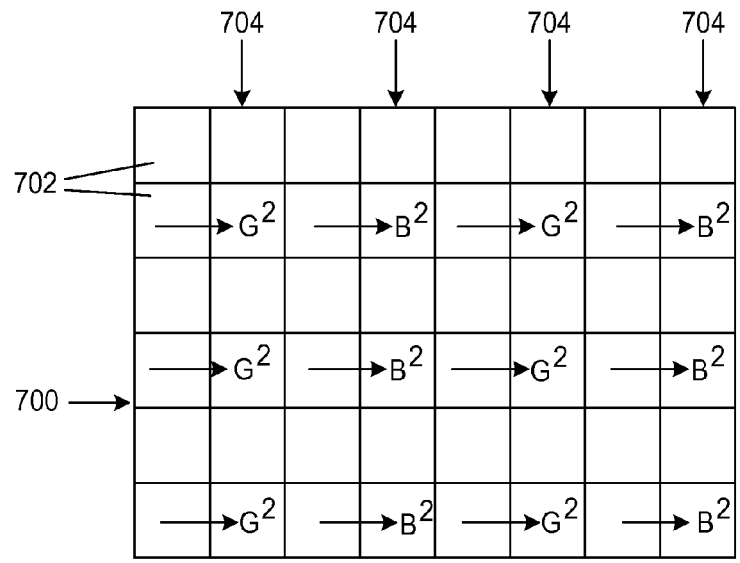
Figure 9E:
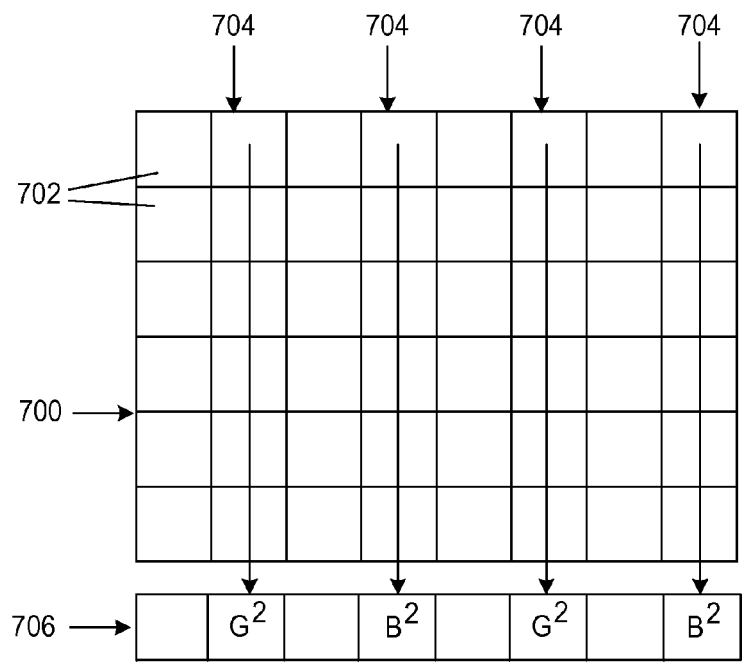

The charge packets in the pixels not included in the first portion of pixels are transferred to the VCCDs 704 and read out of the image sensor, as shown in blocks 806 and 808. These two blocks are illustrated in FIGS. 9D and 9E, respectively. The method of FIG. 8 then ends. Other embodiments in accordance with the invention can repeat the method of FIG. 8 a given number of times.

In the embodiment of the invention described in FIG. 8, the two reduced motion blur images captured with the first portion of pixels have integration times that are sequential and are not overlapped in time. In contrast, the low noise image captured with the pixels not included in the first portion of pixels has an integration time that is overlapped in time and spatially overlapped with the reduced motion blur images.

Figure 10:
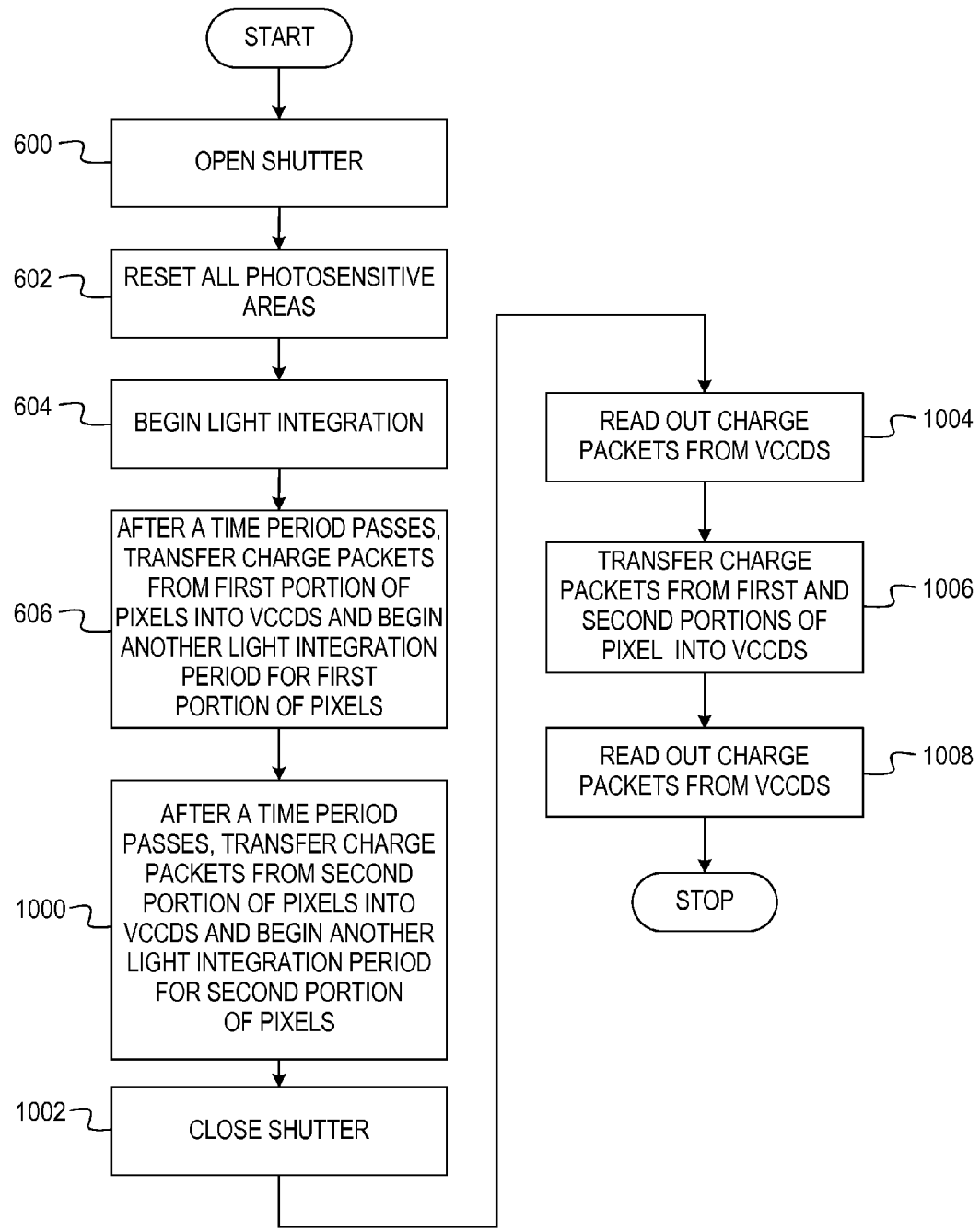
FIG. 10 is a flowchart of a third method for capturing and reading out multiple images in an embodiment in accordance with the invention.

FIG. 10 is a flowchart of a third method for capturing and reading out multiple images in an embodiment in accordance with the invention. The third method utilizes two fields of pixels for a first and second portion of pixels and a progressive readout, with the first and second fields both capturing two sequential images to produce four overlapped images.

Blocks 600, 602, 604, 606 in FIG. 10 are the same blocks as those shown in FIG. 6 wherein charge packets for a first portion of pixels are transferred into the VCCD following a first integration time. Additionally, FIGS. 7A and 7B illustrate blocks 604 and 606, respectively. Some of the blocks shown in FIG. 10 will be described with reference to FIGS. 11A-11E, with FIG. 11A following FIG. 7B.

Figure 11A:
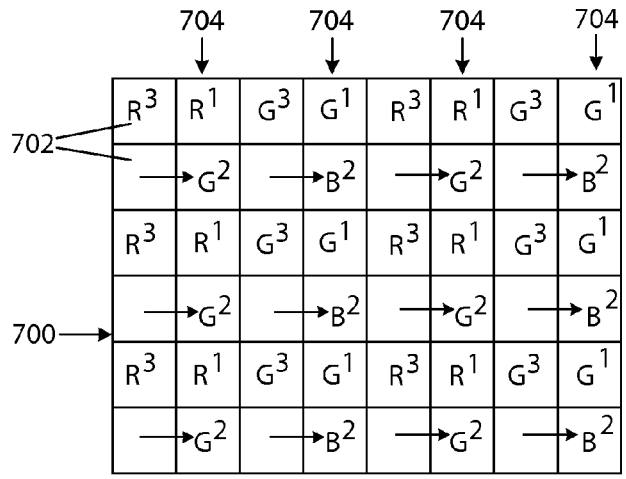
FIGS. 11A-11E are graphical illustrations of some of the blocks shown in FIG. 10.

At block 1000, after a predetermined time period has passed (the end of a second integration period), charge packets are transferred from a second portion of the pixels to the empty charge storage elements in the VCCDs 704. This block is depicted in FIG. 11A. Transferring the charge packets from the first and second portions of pixels upon completion of the first and second integration periods, respectively, effectively resets the photosensitive areas in the pixels so that two additional images can be captured using the first and second portions of pixels without having to wait for readout of the charge packets in the VCCDs.

Figure 11B:
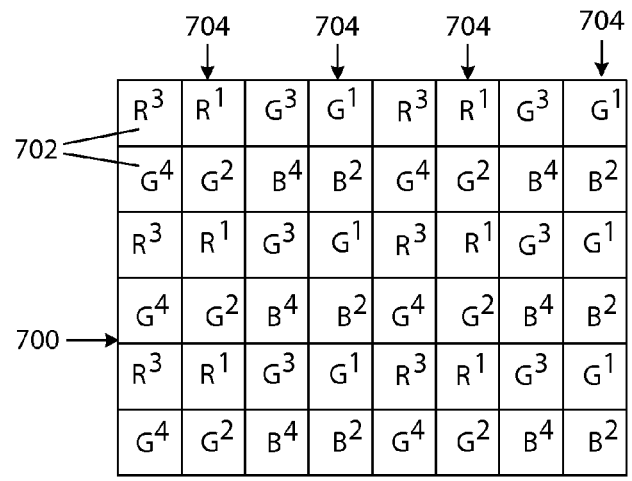

Next, at block 1002, the mechanical shutter is closed. FIG. 11B illustrates the state of the pixels and VCCDs at this point in the method. As shown in FIG. 11B, the charge packets in the VCCDs 704 from the first portion of pixels have a first integration period (represented by the superscript 1), the charge packets in the VCCDs from the second portion of pixels have a second integration period (represented by the superscript 2), the charge packets remaining in the photosensitive areas of the first portion of pixels have a third integration period (represented by the superscript 3), and the charge packets remaining in the photosensitive areas of the second portion of pixels have a fourth integration period (represented by the superscript 4). In this embodiment, the sum of the first and third integration periods substantially equals the sum of the second and fourth integration periods.

Figure 11C:
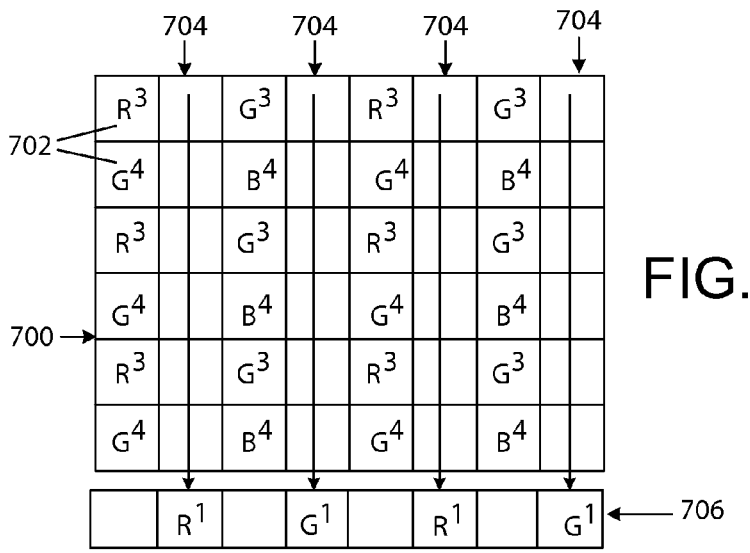
Figure 11D:
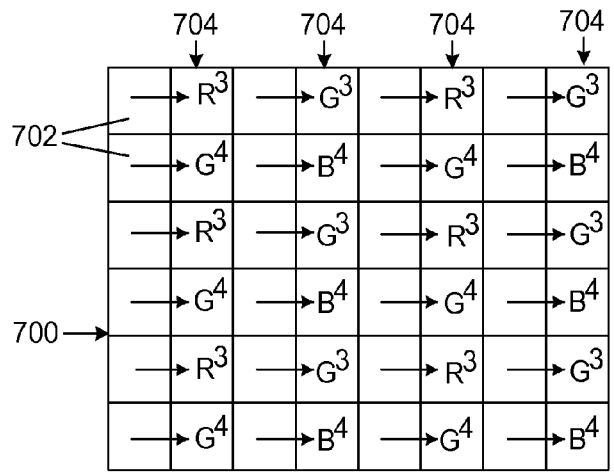
Figure 11E:
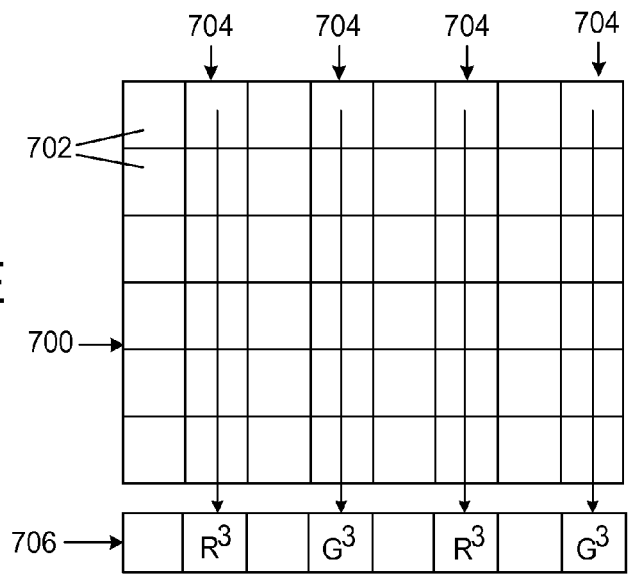

The charge packets are then read out of the VCCDs (block 1004), as shown in FIG. 11C. Next, as shown in block 1006, the charge packets that remain in the photosensitive areas of the first and second portions of pixels are transferred to the VCCDs (see FIG. 11D). The charge packets are then read out of the VCCDs (block 1008 and FIG. 11E). The method of FIG. 10 then ends. Other embodiments in accordance with the invention can repeat the method of FIG. 10 a given number of times.

The exposure periods for each of the four images in this embodiment can be selected to be different, and the exposure periods for all four images can be completed before any of the charge packets for the respective images are readout. By delaying readout of any of the images until after the shutter is closed, smear is reduced in the readout images. Since the CCD image sensor utilizes two fields of pixels with progressive readout, the first two images are transferred into the VCCDs using the two fields of pixels and subsequently readout together to produce a first set of interleaved image pixel data while the charge packets for the third and fourth images are temporarily stored on the photosensitive areas. Similarly, the first and second images are temporarily stored in the VCCD while the third and fourth images are captured. After the first and second images are readout, the charge packets for the third and fourth images are transferred into the VCCDs and then readout together to produce another set of interleaved image pixel data.

Figure 12:
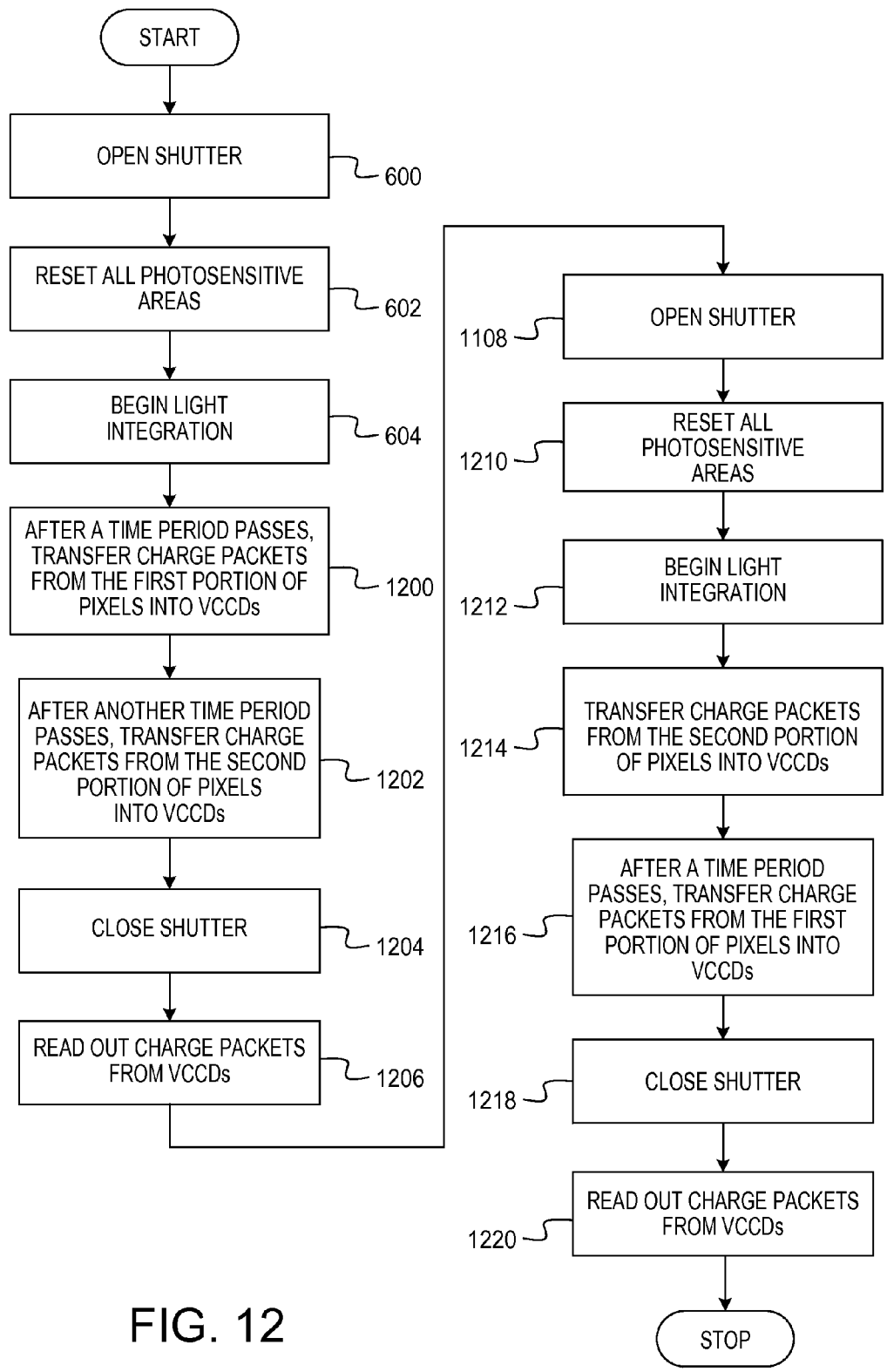
FIG. 12 is a flowchart of a fourth method for capturing and reading out multiple images in an embodiment in accordance with the invention.

Referring now to FIG. 12, there is shown a flowchart of a fourth method for capturing and reading out multiple images in an embodiment in accordance with the invention. This method can be used with both still and video images. Blocks 600, 602, 604 in FIG. 12 are the same blocks as those shown in FIG. 6.

After a predetermined amount of time passes, the charge packets are transferred from a first portion of pixels into the VCCDs, as shown in block 1200. The transferred charge packets represent a first image or, with video, a first sub-image of a first video image. After another predetermined amount of time passes, the charge packets are transferred from a second portion of pixels into the VCCDs (block 1202). The transferred charge packets represent a second image or a second sub-image of the first video image. By way of example only, the first portion of pixels includes the pixels in the odd numbered rows and the second portion of pixels the pixels in the even numbered TOWS.

The shutter is then closed (block 1204) and the charge packets are read out of the VCCDs (block 1206). The charge packets readout of the VCCDs provide interleaved image pixel data for a first and second image from a first and second portion of pixels, respectively. The shutter is opened again at block 1208 and the photosensitive areas reset at block 1210. The reset operation empties the photosensitive areas of residual charge.

Once the shutter is opened, the photosensitive areas begin accumulating or integrating charge packets, as shown in block 1212. After a predetermined amount of time passes, the charge packets are transferred from the second portion of pixels into the VCCDs, as shown in block 1214. The transferred charge packets represent a third image or a first sub-image of a second video image. After another predetermined amount of time passes, the charge packets are transferred from the first portion of pixels into the VCCDs (block 1216). The transferred charge packets represent a fourth image or a second sub-image of the second video image. The shutter is then closed and the charge packets are read out of the VCCDs (blocks 1218, 1220).

The method of FIG. 12 uses a two field progressive readout image sensor wherein pairs of images are captured with different integration times using the first and second portions of pixels. Comparison within the pairs of images with different integration times for each portion of pixels provides information on the motion that is occurring within the scene that is being photographed, as well as information on the movement of the image capture device relative to the scene. By providing multiple images or sub-images with overlapped integration periods, the multiple images or sub-images are at least partially aligned spatially and aligned within time so that the image data and motion information is consistent.

In the embodiment of FIG. 12, the integration times for the first and second portions of pixels can be selected such that within the pairs of images, the integration times alternate between short and long with the total integration times for each image pair being the same. In this way, the images or sub-images can be compared within an image pair or between image pairs to determine the motion that is present in the scene, while the images or sub-images in the image pairs can be more easily combined for color matching and alignment since the total integration time within the image pairs is the same for the first and second portions of pixels. The images or sub-images with the short exposure times can be used to reduce motion blur in the combined image while the images or sub-images with the long exposure times can be used to reduce noise in the combined image. The embodiment of FIG. 12 is particularly well suited for use in video capture due to the simple alternating capture of the different portions of pixels with short or long integration times. It should be noted that in most digital cameras, the embodiment shown in FIG. 12 would be typically be implemented with an electronic shutter instead of a mechanical shutter to reduce audio noise during the video capture.

Figure 13:
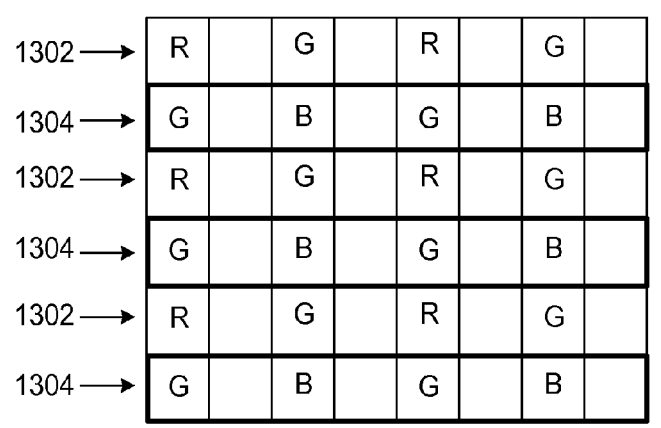
FIG. 13 illustrates a top view of an image sensor and a first color filter array with first and second portions that can be used in the methods shown in FIGS. 6, 8, 10, and 12 in an embodiment in accordance with the invention.

FIG. 13 is a top view of an image sensor and a first color filter array with first and second portions that can be used in the methods shown in FIGS. 6, 8, 10, 12, 18, 24, and 26 in an embodiment in accordance with the invention. The CFA pattern 1300 depicted in FIG. 13 is the Bayer pattern. Those skilled in the art will recognize that different CFA patterns can be used in other embodiments in accordance with the invention. For example, CFA patterns can include red, green, blue, cyan, magenta, yellow, or panchromatic color filter elements or any combination thereof.

The first portion of pixels 1302 includes pixels with red (R) and green (G) color filter elements. The second portion of pixels 1304 is formed from the pixels with green (G) and blue (B) color filter elements. With the Bayer pattern, the first and second portions of pixels alternate every other row with each other. In this embodiment of the invention, the first and second portions of pixels are comprised of one row each and as such, the first and second fields of the image sensor are comprised of alternating single rows.

Figure 14:
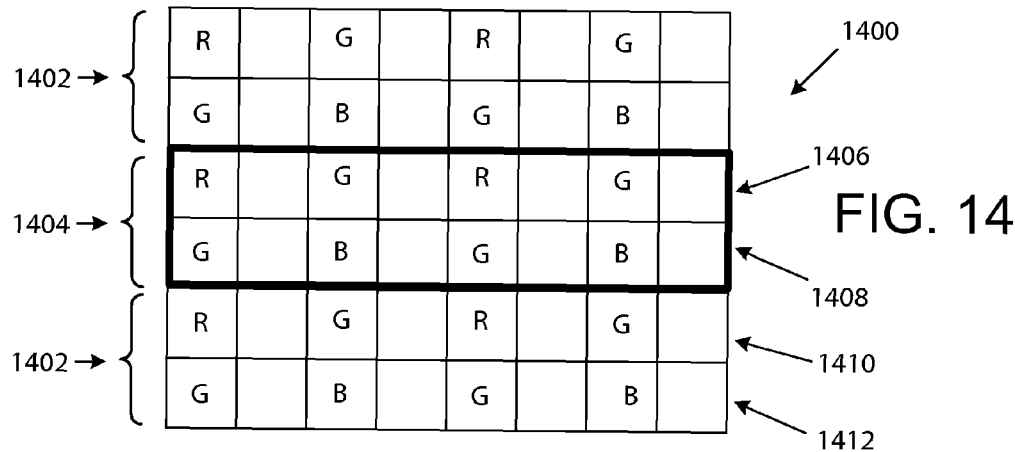
FIG. 14 depicts a top view of an image sensor and a second color filter array with first and second portions that can be used in the methods shown in FIGS. 6, 8, 10, and 12 in an embodiment in accordance with the invention.

FIG. 14 is a top view of an image sensor and a second color filter array with first and second portions that can be used in the methods shown in FIGS. 6, 8, 10, 12, 18, 24, and 26 in an embodiment in accordance with the invention. Like FIG. 13, the CFA pattern 1400 depicted in FIG. 14 is the Bayer pattern. Those skilled in the art will recognize that different CFA patterns can be used in other embodiments in accordance with the invention.

The first portion of pixels 1402 includes two rows of pixels having one row of red (R) and green (G) color filter elements and one row of green (G) and blue (B) color filter elements. The second portion of pixels 1404 is formed from the next two adjacent rows of pixels. Thus, the first and second portions 1402, 1404 both include pixels having red, green, and blue color filter elements for a complete set of pixel color information. In this embodiment of the invention, the first and second portions of pixels are comprised of two rows each and as such, the first and second fields of the image sensor are comprised of alternating row pairs.

Figure 15:
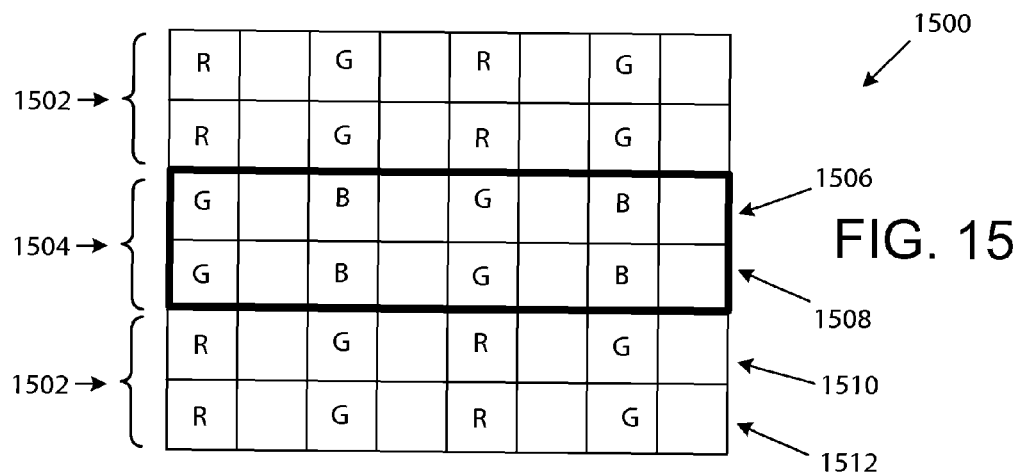
FIG. 15 illustrates a top view of an image sensor and a third color filter array with first and second portions that can be used in the methods shown in FIGS. 6, 8, 10, and 12 in an embodiment in accordance with the invention.

FIG. 15 illustrates a top view of an image sensor and a third color filter array with first and second portions that can be used in the methods shown in FIGS. 6, 8, 10, 12, 18, 24, and 26 in an embodiment in accordance with the invention. The CFA pattern 1500 is similar to the Bayer pattern but uses two adjacent rows of red (R) and green (G) color filter elements and two adjacent rows of green (G) and blue (B) color filter elements, thus providing a double Bayer pattern. The first portion of pixels 1502 includes the two rows of red (R) and green (G) color filter elements. The second portion of pixels 1504 is formed from the next two rows of green (G) and blue (B) color filter elements. Other double row patterns can also be used in embodiments in accordance with the invention, where other colors or arrangements of colors are provided in a repeating row pair arrangement in the color filter array. In the FIG. 15 embodiment, the first and second portions of pixels are comprised of two rows each and as such, the first and second fields of the image sensor are comprised of alternating row pairs.

In an alternate embodiment of the invention, a double row pattern such as the color filter array shown in FIG. 15, is used with an image sensor where the portions of pixels can be readout in single rows so that each portion of pixels receives a complete set of color information. In this case, the first portion of pixels can include row 1506 comprised of green and blue pixels and 1510 comprised of red and green pixels, while the second portion of pixels can include rows 1508 comprised of green and blue pixels and 1512 comprised of red and green pixels. In this embodiment, the image sensor has two fields comprised of alternating single rows.

Figure 16:
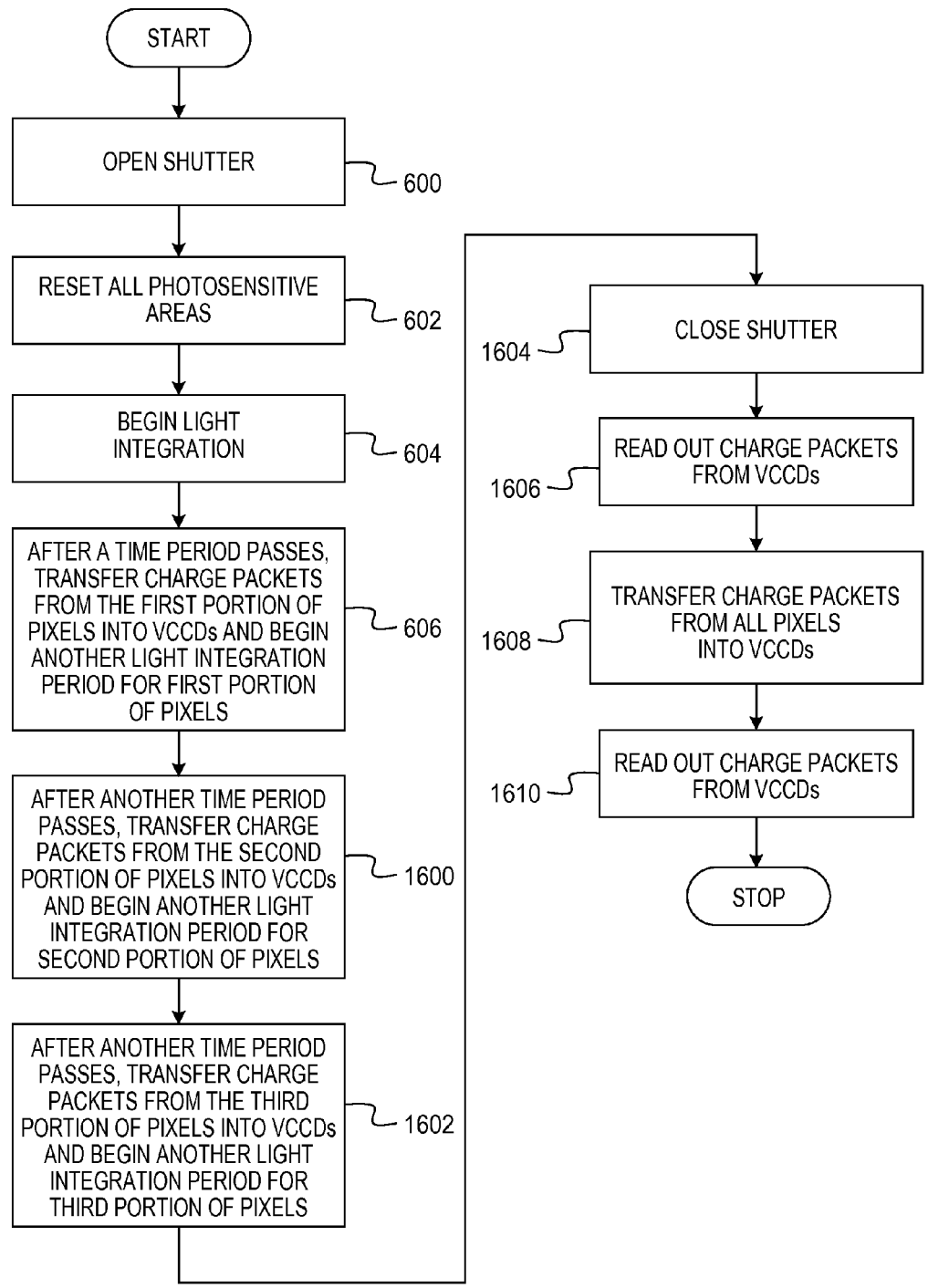
FIG. 16 is a flowchart of a fifth method for capturing and reading out multiple images in an embodiment in accordance with the invention.

Referring now to FIG. 16, there is shown a flowchart of a fifth method for capturing and reading out multiple images in an embodiment in accordance with the invention. The fifth method utilizes three fields of pixels and a progressive readout, with the first, second, and third fields capturing three sequential images to produce six overlapped images.

Blocks 600, 602, 604, 606 in FIG. 16 are the same blocks as those shown in FIG. 6. At block 1600, after a predetermined amount of time has passed (the end of a second integration period), the accumulated charge packets in a second portion of the pixels in the imaging area are transferred to respective charge storage elements in the VCCDs and another integration period begins for the pixels in the second portion of pixels. After another predetermined amount of time has passed (the end of a third integration period), the accumulated charge packets in a third portion of the pixels in the imaging area are transferred to respective charge storage elements in the VCCDs and another integration period begins for the pixels in the third portion of pixels (block 1602).

The mechanical shutter is then closed (block 1604) and the charge packets in the VCCDs are read out (block 1606). The remaining charge packets that are temporarily stored in the photosensitive areas in all of the pixels are then transferred to the VCCDs, as illustrated in block 1608. Next, the charge packets are read out of the VCCDs, as shown in block 1610. The method of FIG. 16 then ends. Other embodiments in accordance with the invention can repeat the method of FIG. 16 a given number of times.

The integration periods for each of the six images can be selected to be different and the integration periods for all six images can be completed before any of the charge packets for the respective images are readout. Since the CCD image sensor has a three field progressive readout, the first three images are transferred into the VCCDs using the three fields of pixels and subsequently readout together to produce interleaved image pixel data while the charge packets for the fourth, fifth, and sixth images are temporarily stored on the photosensitive areas. After the first three images are readout, the charge packets for the fourth, fifth, and sixth images are transferred into the VCCDs and then readout together to produce interleaved image pixel data.

Figure 17:
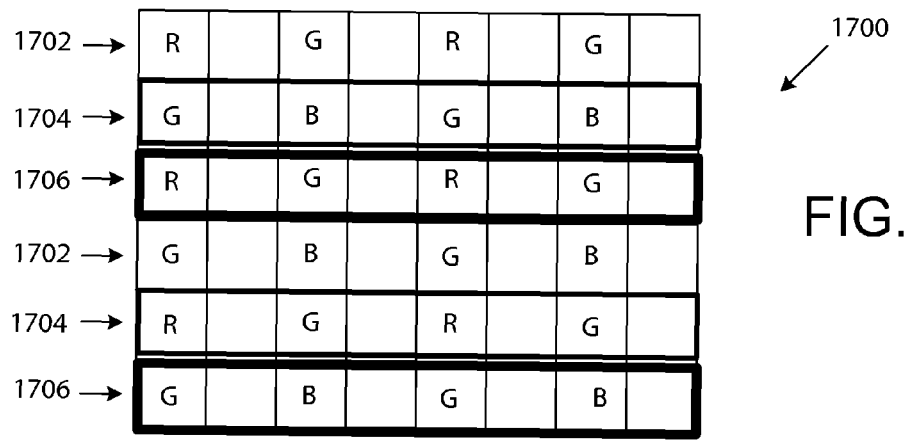
FIG. 17 depicts a top view of an image sensor and a fourth color filter array with multiple portions that can be used in the methods shown in FIG. 16 in an embodiment in accordance with the invention.

FIG. 17 depicts a top view of an exemplary fourth color filter array illustrating multiple portions that can be used in the methods shown in FIG. 16 in an embodiment in accordance with the invention. The first portion of pixels 1702 includes one row of pixels having red (R) and green (G) color filter elements. The second portion of pixels 1704 is formed from the next row of pixels having green (G) and blue (B) color filter elements. Lastly, the third portion of pixels 1706 includes another row of pixels having red (R) and green (G) color filter elements. With the FIG. 17 embodiment, the next row within the three different portions of pixels provides the other half of the color filter array so that a complete set of pixel colors is captured within each portion of pixels. For this example, while the first row shown for the first portion of pixels includes the red and green color filter array, the second row shown for the first portion of pixels includes the green and blue color filter array. In this way, each portion of pixels includes the complete set of colors in the color filter array.

Other embodiments in accordance with the invention are not limited to this arrangement and CFA 1700. By way of example only, a different CFA pattern can be used, or the first, second, and third portions can be configured differently in other embodiments in accordance with the invention. The first, second, and third portions, for example, can include multiple adjacent rows of pixels.

It should be noted that embodiments in accordance with the invention can provide a sensor with two fields of pixels that are two rows wide each, or provide a sensor with four fields of pixels that are one row wide each where the integration period is selected to be the same for the adjacent rows such that fields or portions of pixels with complete sets of color information can be provided after readout. For the embodiment shown in FIG. 14, a field of pixels can be used to readout row 1406 while a second field can be used to readout row 1408, where the integration period for rows 1406 and 1408 are selected to be the same for each image captured with these rows. This allows portion 1404 to include complete color information. Likewise, a third field can used to readout row 1410 while a fourth field can be used to readout row 1412 and the integration periods for the images captured with rows 1410 and 1412 are selected to be the same for each image captured with these rows. This allows portion 1402 to be provided with complete color information. The integration periods for the first and second portions 1402, 1404 can be selected in the same way as shown for the two field readouts in FIGS. 6 and 7, 8 and 9, 10 and 11, and 12. This aspect of the invention is also applicable to readouts with larger numbers of fields such as shown in FIG. 16. In addition, for image sensors that have a different color filter array pattern, more rows may be required to provide complete color information fields, thereby requiring more fields or wider fields to readout.

Embodiments in accordance with the invention can also bin or combine charge packets from two or more photosensitive areas during readout. Binning charge packets increases sensitivity of the image sensor and reduces noise. Binning can be done by combining charge packets in the VCCD, combining charge packets in the HCCD or combining consecutive charge packets in a sense node or charge-to-voltage conversion region. By combining charge packets, binning effectively increases the size of photosensitive area of the combined pixels or increases the sensitivity to light of the combined pixels. By binning during readout, images with short exposure times and reduced motion blur can be produced with lower noise or increased signal to noise ratio.

Figure 18:
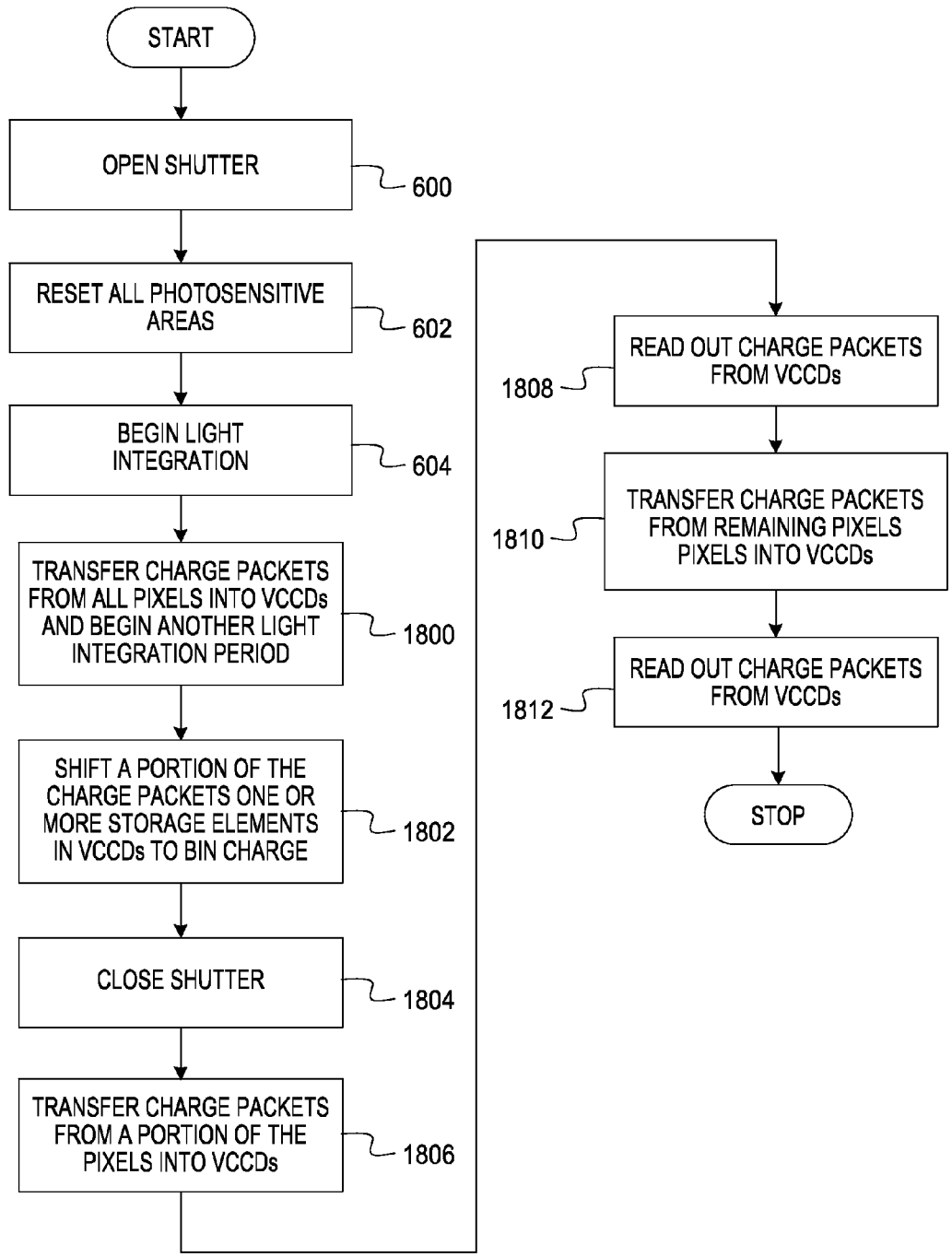
FIG. 18 is a flowchart of a first method for capturing and reading out multiple images and binning charge from multiple captured images in an embodiment in accordance with the invention.

Referring now to FIG. 18, there is shown a flowchart of a first method for capturing and reading out multiple images and binning charge from multiple captured images in an embodiment in accordance with the invention. This method bins charge packets within the VCCDs by shifting the charge packets within the VCCDs. Blocks 600, 602, 604 in FIG. 18 are the same blocks as those shown in FIG. 6. Some of the blocks shown in FIG. 18 will be described with reference to FIGS. 19A-19G, with FIG. 19A following FIG. 7A.

Figure 19A:
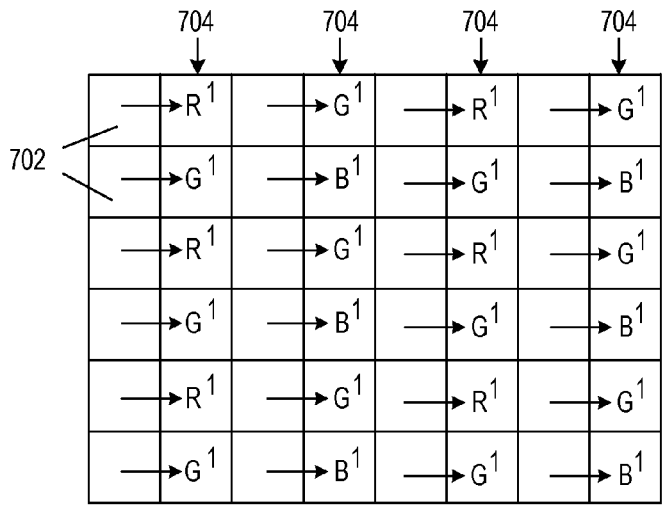
FIGS. 19A-19E are graphical illustrations of some of the blocks shown in FIG. 18.

At block 1800 the accumulated charge packets in all of the pixels are transferred to respective charge storage elements in the VCCDs. FIG. 19A illustrates the charge packets transferred from the pixels 702 to the VCCDs 704. The photosensitive areas begin another integration period upon transfer of the charge to the VCCDs. This is because the transfer of the charge packets from the pixels to the VCCDs effectively resets the photosensitive areas in the pixels, so that a second image can be captured using the same pixels without having to wait for the charge packets in the first image to be readout. The superscript numeral 1 represents the first integration period.

Figure 19B:
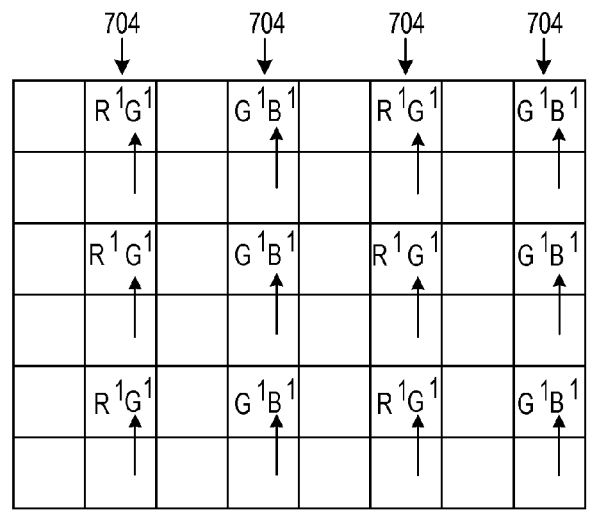

A portion of the charge packets in the VCCDs are then shifted one or more charge storage elements within each VCCD (block 1802). FIG. 19B depicts a portion of the charge packets in the VCCDs 704 shifted one charge storage element within the VCCDs. In FIG. 19B, the charge packets for the colors green and blue are shifted up one charge storage element to be binned with the charge packets for colors red and green, respectively.

Figure 19C:
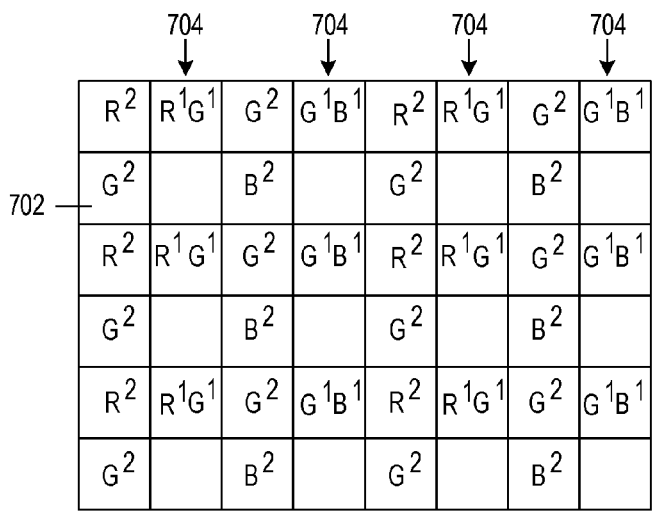

The shutter is then closed at block 1804, which ends the second light integration period for the photosensitive areas. FIG. 19C depicts the state of the imaging area after the shutter is closed. The superscript numeral 2 in pixels 702 represents the second integration period. The binning process alternates binned charges and empty charge storage elements within the VCCDs.

Figure 19D:
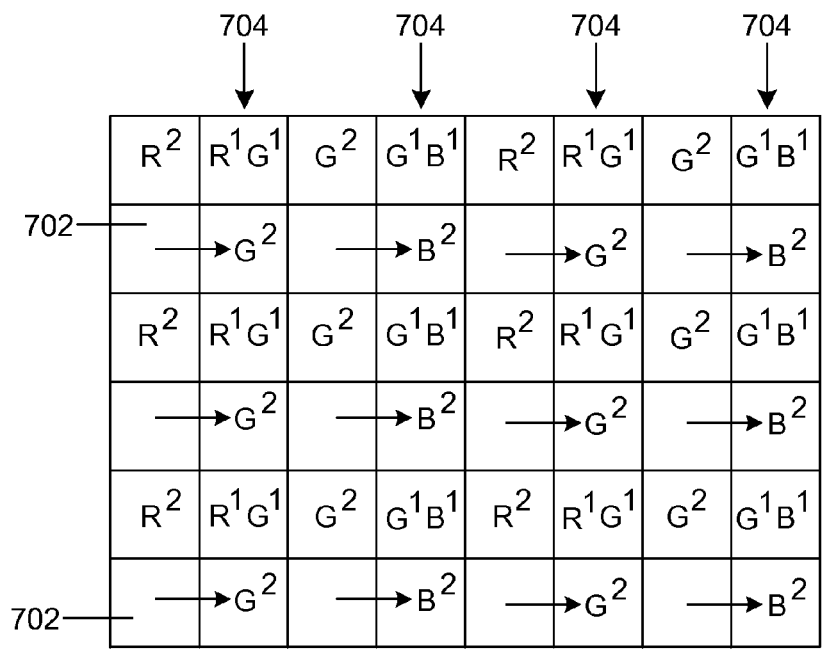
Figure 19E:
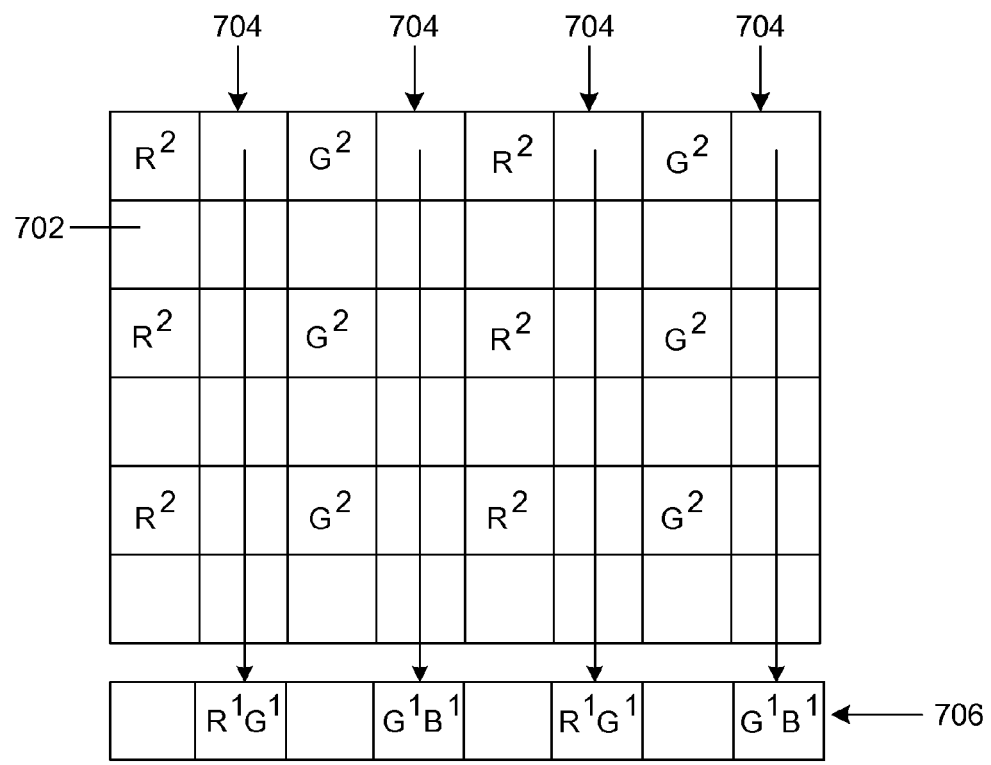

Next, at block 1806, the charge packets from a portion of the photosensitive areas corresponding to the empty charge storage elements are transferred to respective charge storage elements in the VCCDs. The process of transferring the portion of charge packets into the respective empty charge storage elements is shown in FIG. 19D. The charge packets in the VCCDs 704 are then read out of the VCCDs (block 1808 and FIG. 19E).

Figure 19F:
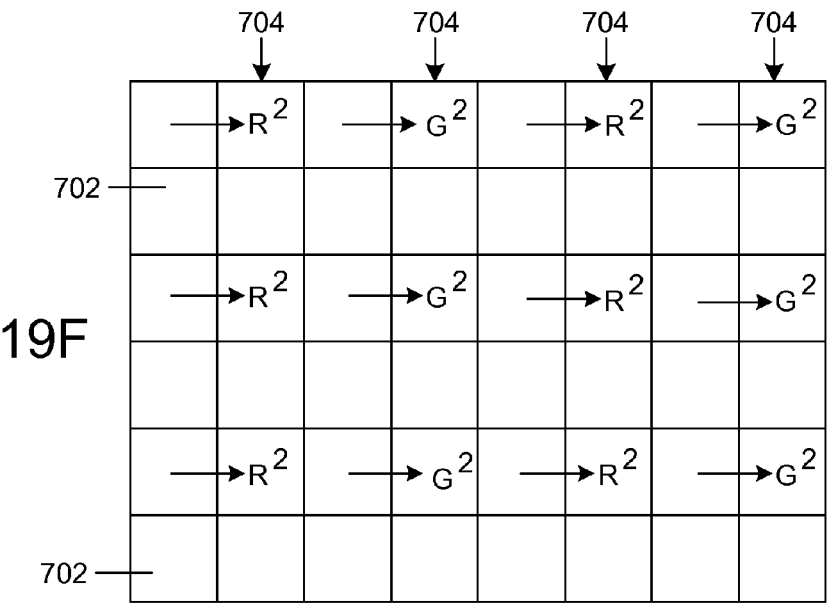
Figure 19G:
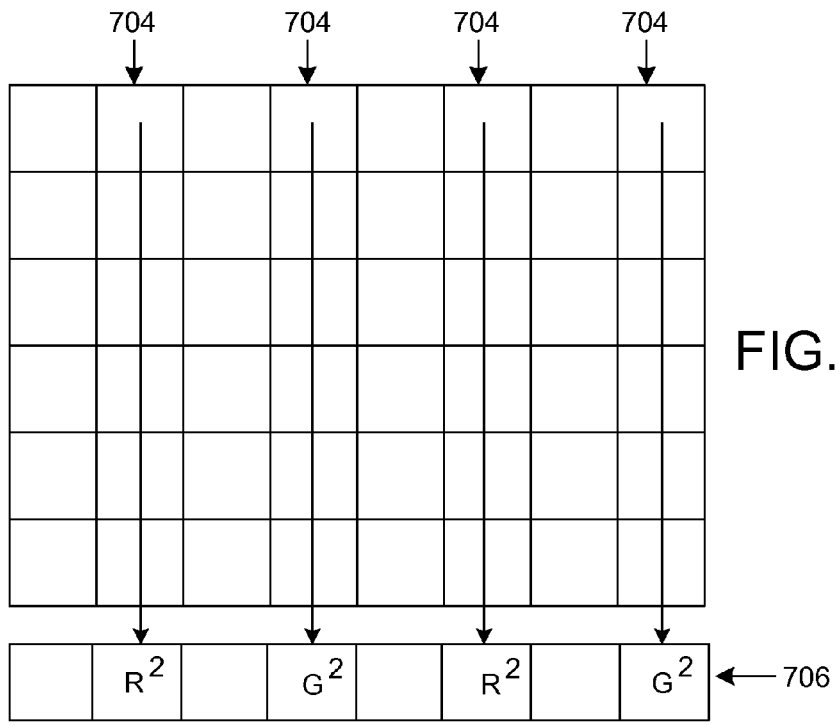

The charge packets in the remaining photosensitive areas are then transferred to respective charge storage elements in the VCCDs (block 1810). Block 1810 is depicted in FIG. 19F. The charge packets in the VCCDs 704 are then read out of the VCCDs (block 1812 and FIG. 19G).

Figure 20:
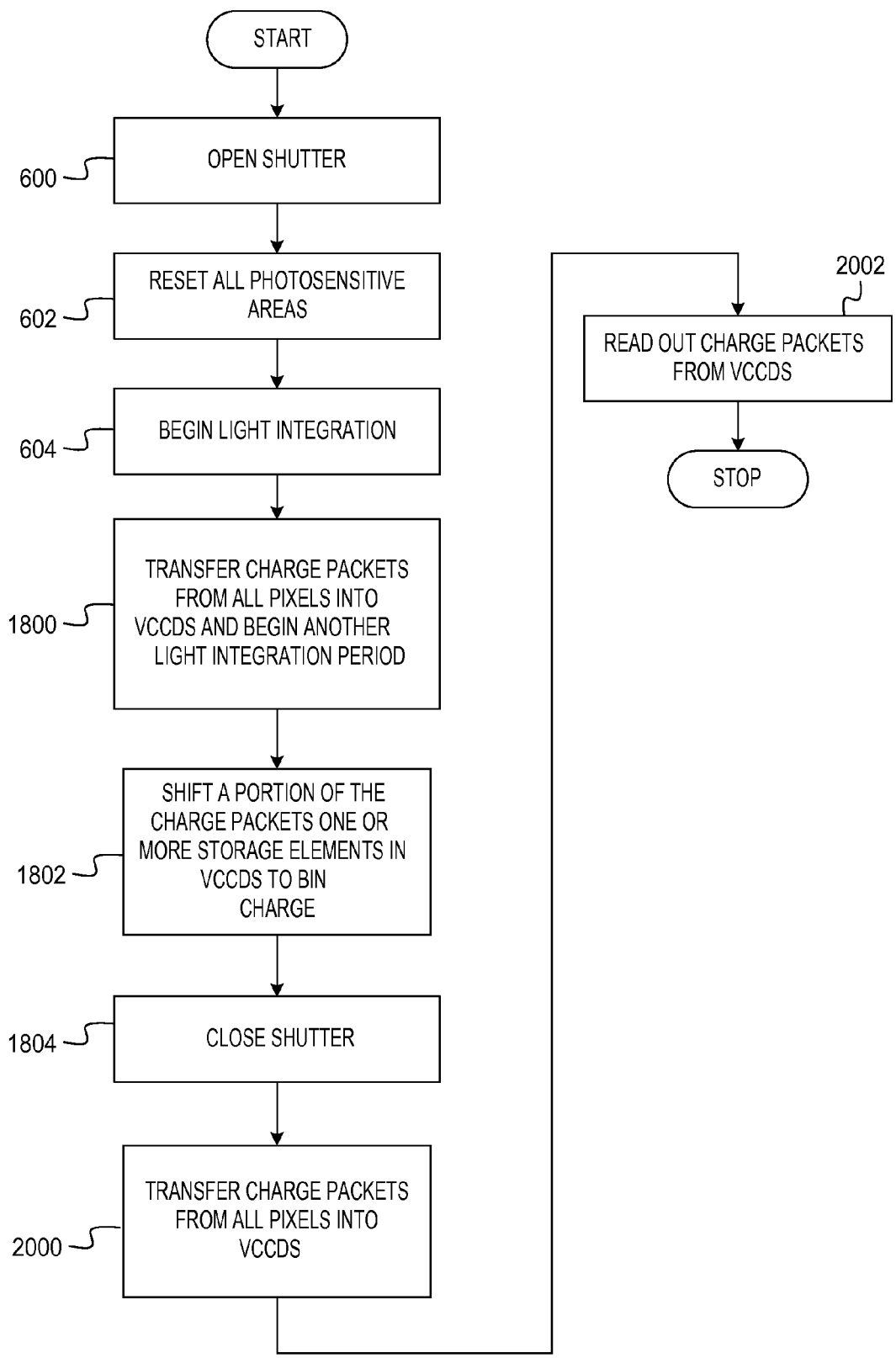
FIG. 20 is a flowchart of a second method for capturing and reading out multiple images and binning charge from multiple captured images in an embodiment in accordance with the invention.

FIG. 20 is a flowchart of a second method for capturing and reading out multiple images and binning charge from multiple captured images in an embodiment in accordance with the invention. A color filter array of the type illustrated in FIG. 15 is used with an image sensor with a two field progressive readout where each field is comprised of one row. This method bins charge packets within the VCCDs by shifting the charge packets within the VCCDs and by transferring charge packets into the VCCDs. Blocks 600, 602, 604 and 1800, 1802, 1804 in FIG. 20 are the same blocks as those shown in FIG. 6 and FIG. 18, respectively. Some of the blocks shown in FIG. 20 will be described with reference to FIGS. 21A-21F.

Figure 21D:
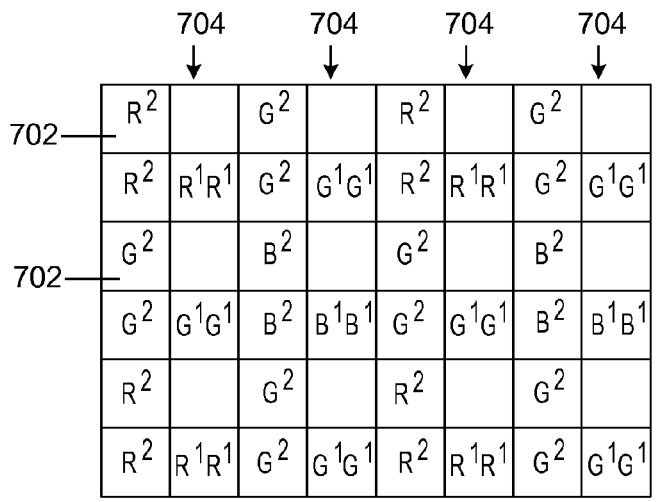

Within the embodiment of the invention shown in FIGS. 20 and 21, charge packets representing the same color are binned within the VCCDs 704 after the charge packets from all of the photosensitive areas are transferred to the VCCDs 704 (block 1800; FIG. 21B), and a portion of the charge packets are shifted within the VCCDs 704 (block 1802; see FIG. 21C). FIG. 21D illustrates the state of the imaging area after the shutter is closed at block 1804. As shown, charge packets representing the same color and having the same integration period are binned together in the VCCDs 704. The photosensitive areas in the pixels 702 contain charge packets having a different integration period from the charge packets in the VCCDs 704.

Figure 21E:
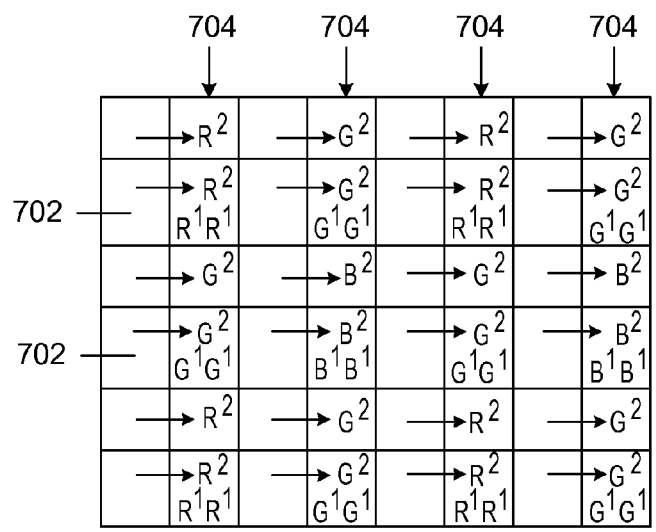
Figure 21F:
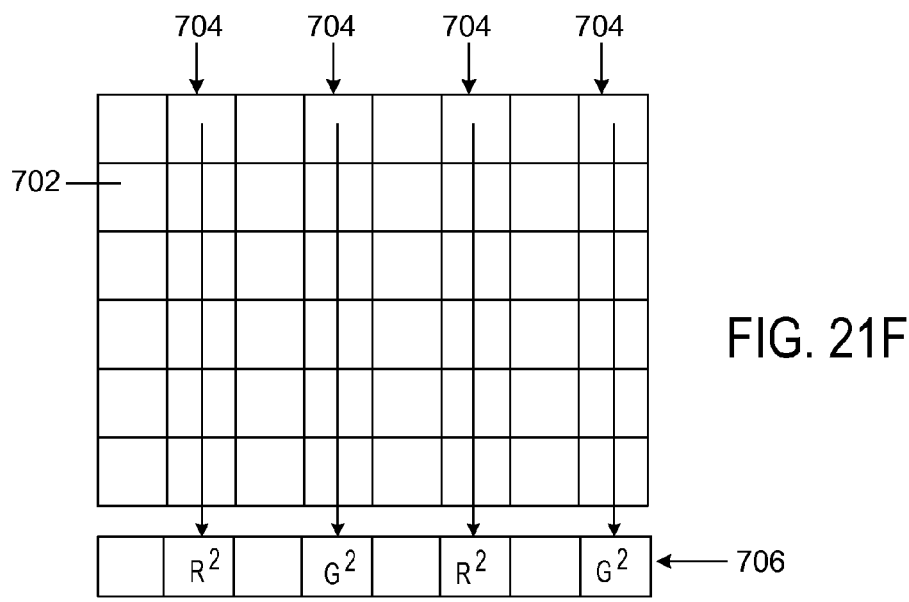

At block 2000, the charge packets from all the photosensitive areas are transferred to respective charge storage elements in the VCCDs 704. FIG. 21E illustrates the charge packets being transferred into respective charge storage elements in the VCCDs 704, thereby binning two $R^1$ charge packets and one $R^2$ packet while maintaining one $R^2$ charge packet is unbinned in the VCCDs. Similarly binned and unbinned G and B charge packets are also present in the VCCDs as presented by the color filter array pattern. Thus, the same colors are spatially binned together at block 2000, and the binned charge packets in the VCCDs 704 have different total integration periods as well. The charge packets in the VCCDs 704 are then read out of the VCCDs (block 2002 and FIG. 21F).

Figure 22A:
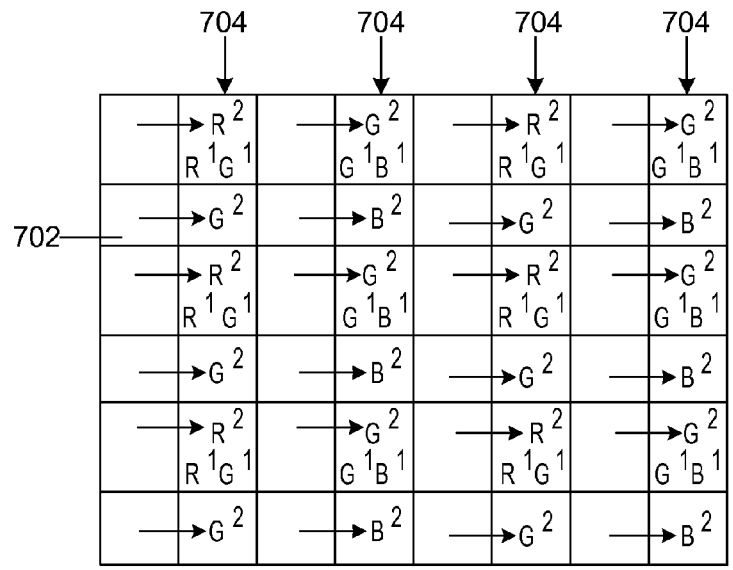
FIGS. 22A-22B are alternate graphical illustrations of some of the blocks shown in FIG. 20.
Figure 22B:
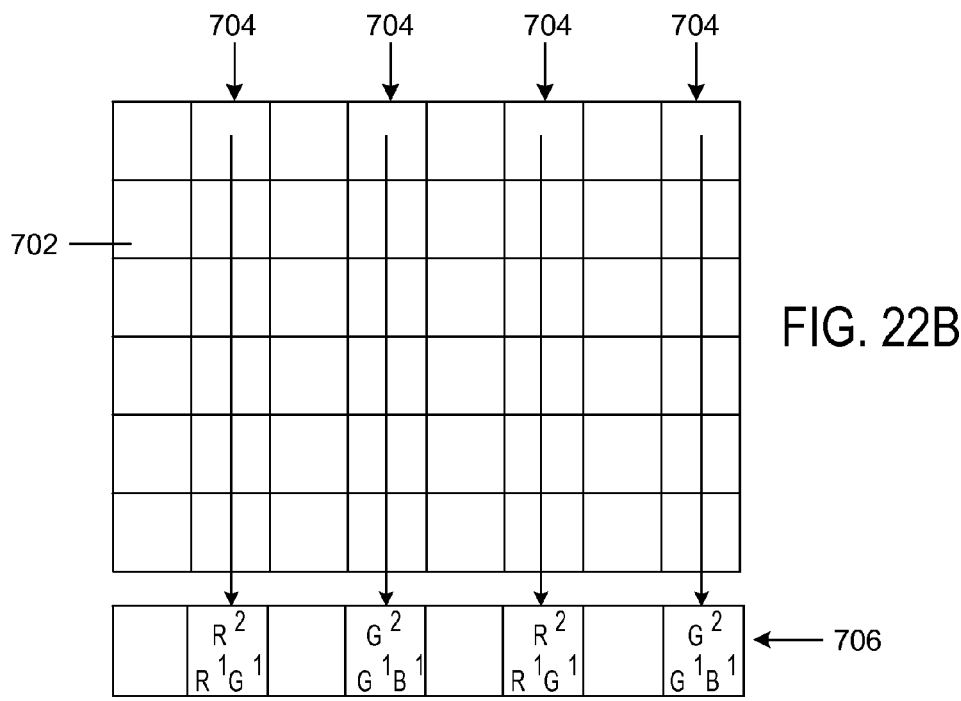

FIGS. 22A-22B depict an alternate embodiment for an image sensor with two field readout, where the readout fields are illustrated by the color filter array shown in FIG. 7A (each field includes a single row). FIGS. 22A and 22B are alternate embodiments to FIGS. 21E and 21F. Following the same flowchart shown in FIG. 20, after the shutter is closed at block 1804, the charge packets from all of the photosensitive areas are transferred to respective charge storage elements in the VCCDs (block 2000 and FIG. 22A). The charge packets for the color red having the second integration period (superscript 2) are thereby binned with the previously binned red and green charge packets having the first integration period (superscript 1). The charge packets in the VCCDs 704 are then read out of the VCCDs (block 2002 and FIG. 22B).

Figure 23A:
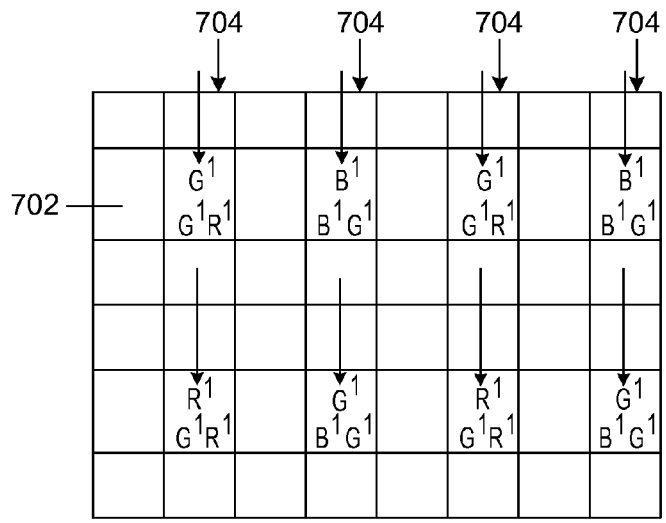
FIGS. 23A-23C are alternate graphical illustrations of some of the blocks shown in FIG. 20.
Figure 23B:
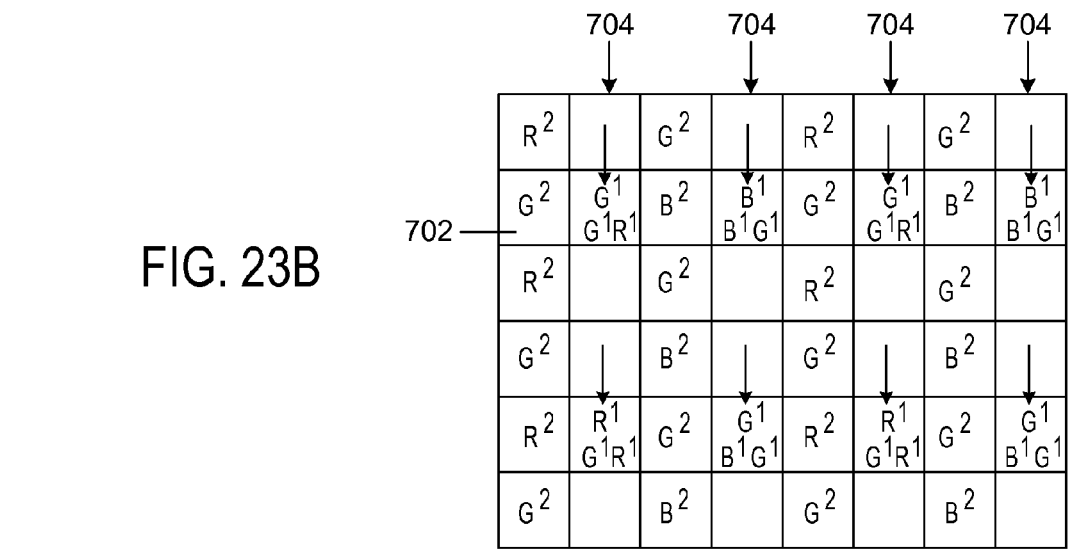
Figure 23C:
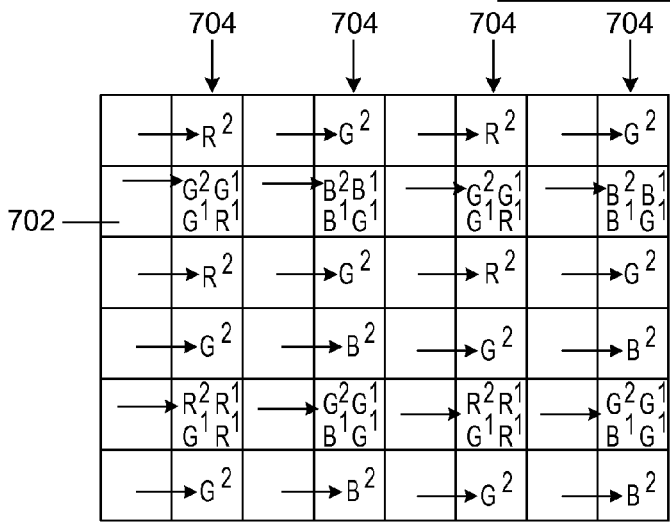

FIGS. 23A-23C are alternate graphical illustrations of some of the blocks shown in FIG. 20. FIG. 23A depicts an alternative embodiment for block 1802 in FIG. 20, where the charge packets from three photosensitive areas are binned together using an image sensor with three field readout, wherein the readout fields are illustrated in FIG. 7A. FIG. 23B illustrates the state of the imaging area at block 1804, when the shutter is closed. And FIG. 23C depicts an alternative embodiment for block 2000, where the charge packets having the second integration period are transferred from pixels 702 to respective charge storage elements in the VCCDs 704. In this alternate embodiment, four charge packets are binned together in some charge storage elements of the VCCDs where the four charge packets represent two different colors, with three charge packets having one integration period and the fourth a second, different integration period. The remaining charge storage elements store the charge packets from one photosensitive area and one integration time.

Figure 24:
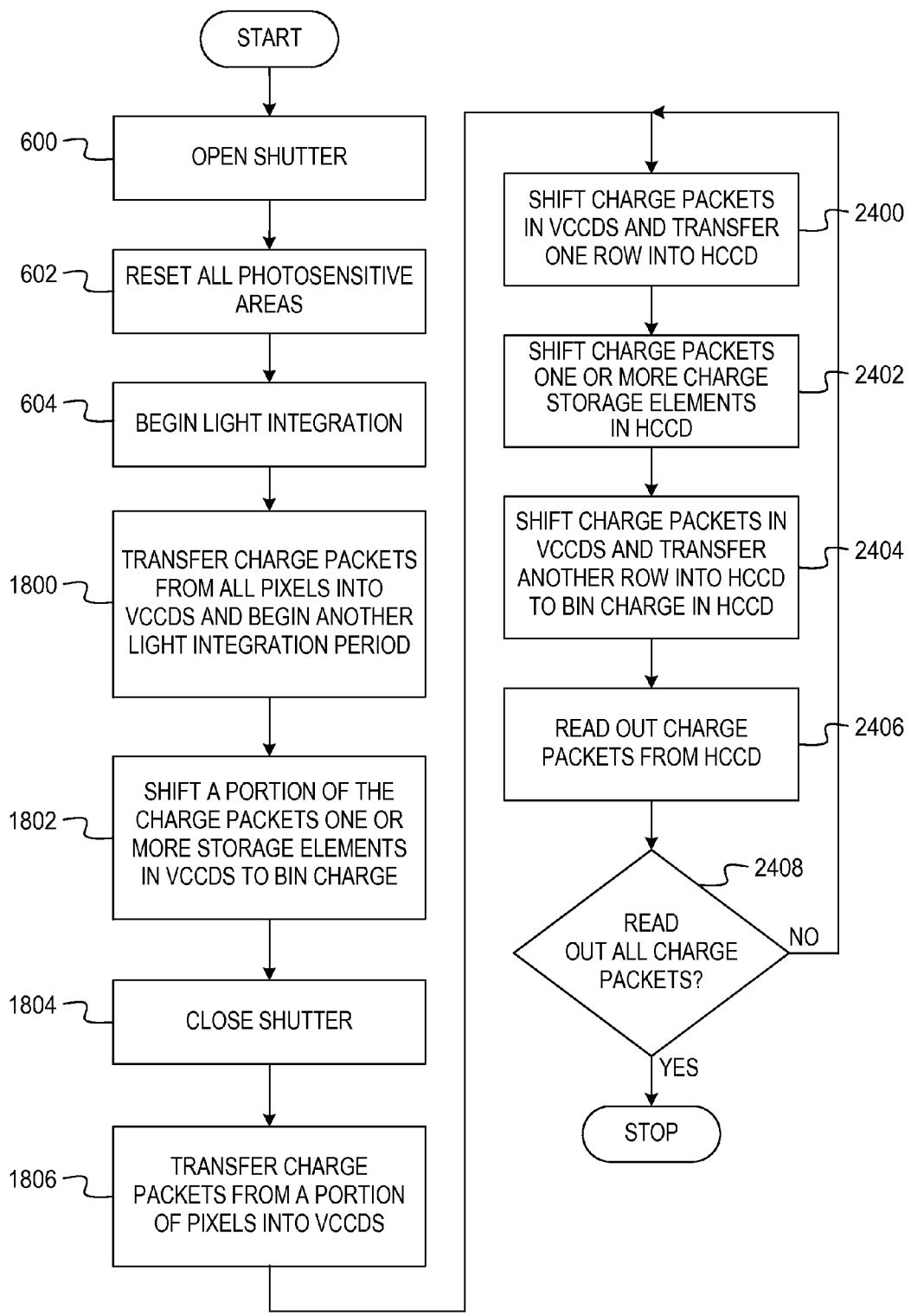
FIG. 24 is a flowchart of a third method for capturing and reading out multiple images and binning charge from multiple captured images in an embodiment in accordance with the invention.

Referring now to FIG. 24, there is shown a flowchart of a third method for capturing and reading out multiple images and binning charge from multiple captured images in an embodiment in accordance with the invention. This method bins charge packets in both the VCCDs and the HCCD by shifting the charge packets within the VCCDs and by transferring charge packets into the HCCD. Blocks 600, 602, 604 and 1800, 1802, 1804, and 1806 in FIG. 24 are the same blocks as those shown in FIG. 6 and FIG. 18, respectively. Some of the blocks shown in FIG. 24 will be described with reference to FIGS. 25A-25D, with FIG. 25A following FIG. 19D.

Figure 25A:
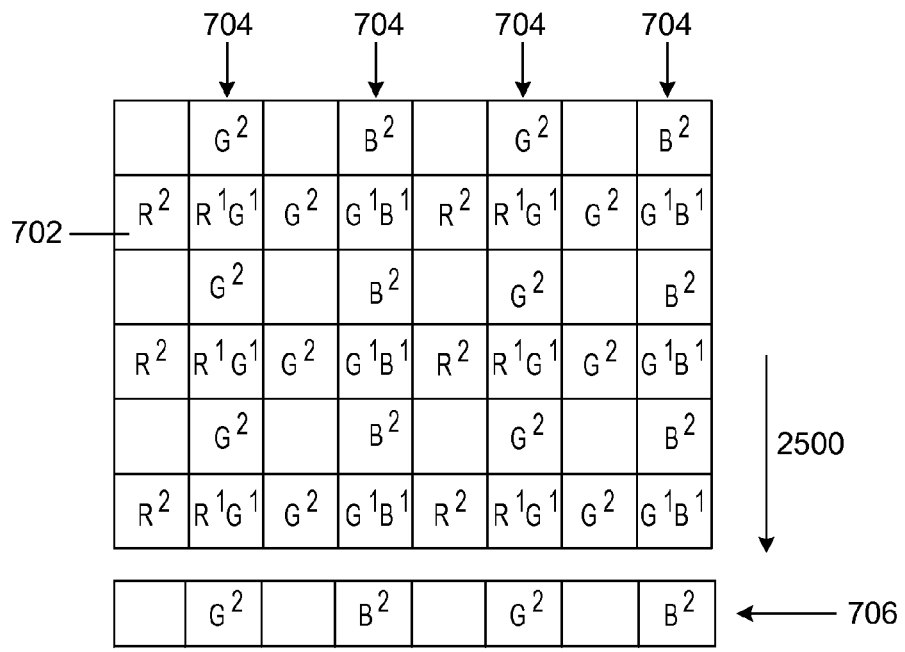
FIGS. 25A-25D are graphical illustrations of some of the blocks shown in FIG. 24.
Figure 25B:
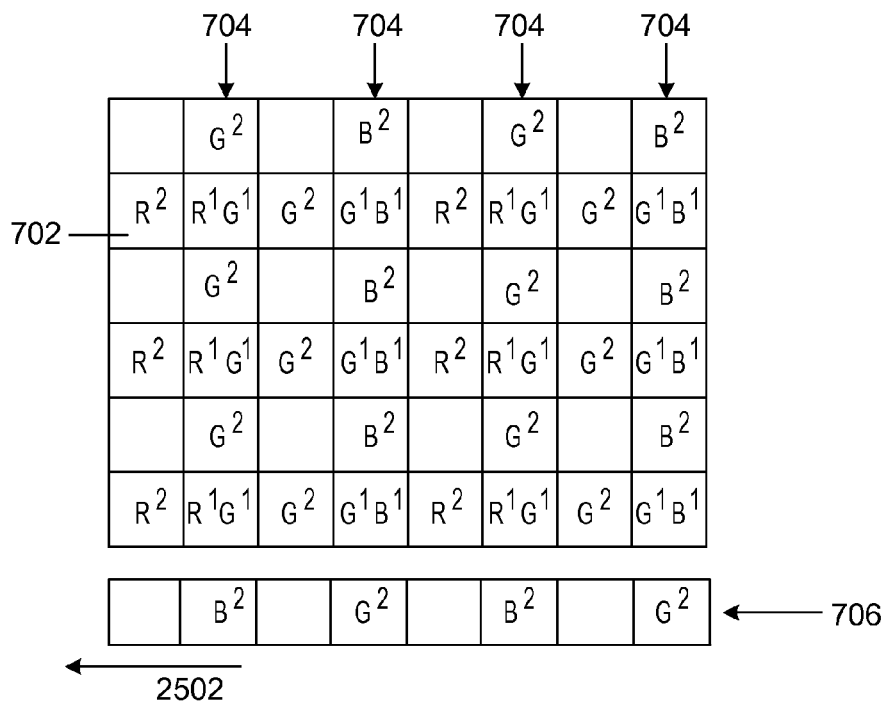

After the shutter is closed at block 1804 and the charge packets from a portion of the photosensitive areas transferred to respective charge storage elements in the VCCDs (block 1806), the charge packets in the VCCDs are shifted down so that a row of charge packets are transferred from the VCCDs into respective charge storage elements in the HCCD 706 (block 2400 and FIG. 25A). Arrow 2500 in FIG. 25A represents the shifting of the charge packets within the VCCDs 704 in block 2400. The charge packets in the HCCD 706 are then shifted horizontally within the HCCD 706 to align with the next adjacent VCCD 704 (block 2402 and FIG. 25B). Arrow 2502 in FIG. 25B represents the shifting of the charge packets within the HCCD 706.

Figure 25C:
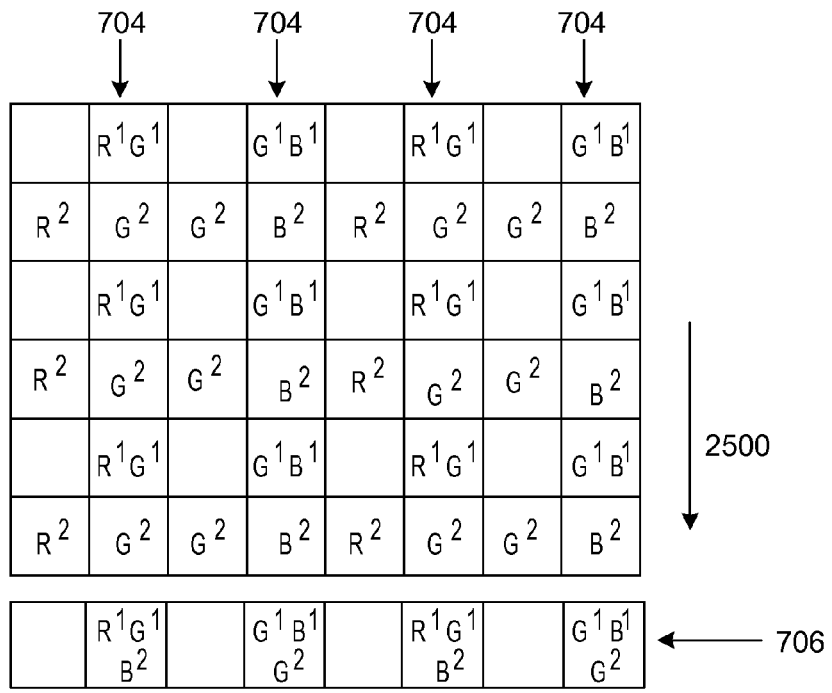

Next, as shown in block 2404, the charge packets in the VCCDs 704 are shifted down again so that a row of charge packets are transferred from the VCCDs to respective charge storage elements in the HCCD 706 (see FIG. 25C). Arrow 2500 in FIG. 25C represents the shifting of charge packets within the VCCDs 704 for a first row of charge packets. This causes the newly transferred charge packets to be binned with the existing charge packets in the HCCD 706 as shown in FIG. 25C, thereby forming binned charge packets alternating in the HCCD between red, green and blue, and green, green and blue. The binning method shown in FIG. 24 provides in the HCCD at least some binned charge packets that contain a complete set of binned color information (red, green and blue is shown in half the charge storage areas of HCCD 706 in FIG. 25C). By providing complete sets of binned color information, a low resolution luma image is provided. Luma images are essentially comprised of black and white images which contain contrast information. Within image processing, luma images can be very important in the image processing chain. Providing a luma image along with various color images, such as for example, the green and blue images readout in FIG. 25, is an advantage.

Figure 25D:
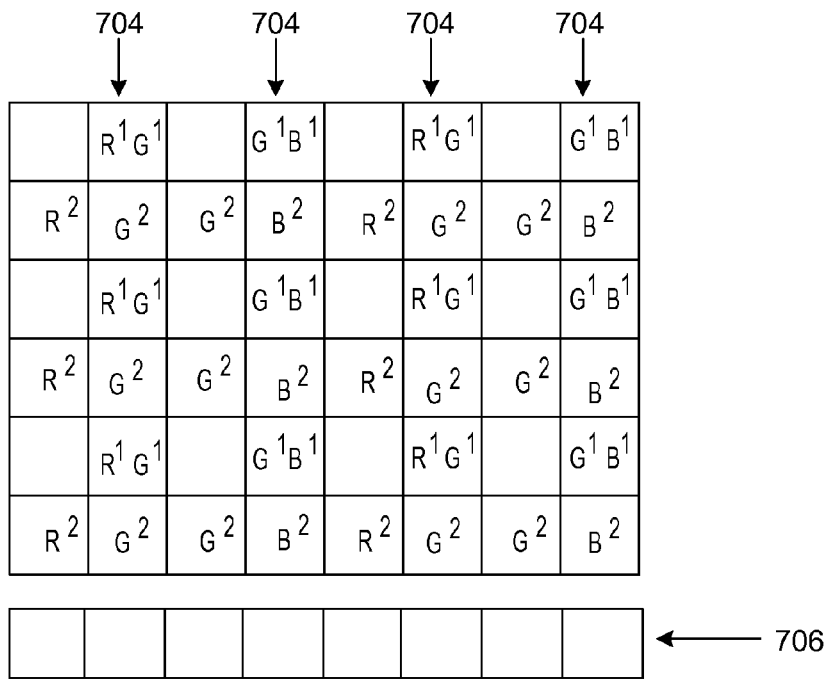

FIG. 25D illustrates block 2406, where the alternating binned charge packets are readout from the HCCD. As shown in block 2408, the readout process as shown by blocks 2400-2406, is repeated until all the charge packets have been readout from the VCCD. As can be seen in FIG. 25D, the next row to be readout from the VCCD is an unbinned row with green and blue charge packets. It should also be noted from FIGS. 25A-25D that in this embodiment, the charge packets associated with the second integration time for the red and green rows are not used, as such, the $R^2$ and $G^2$ charge packets are left in the photosensitive areas during the readout process until the image sensor is reset for the next image capture.

Figure 26:
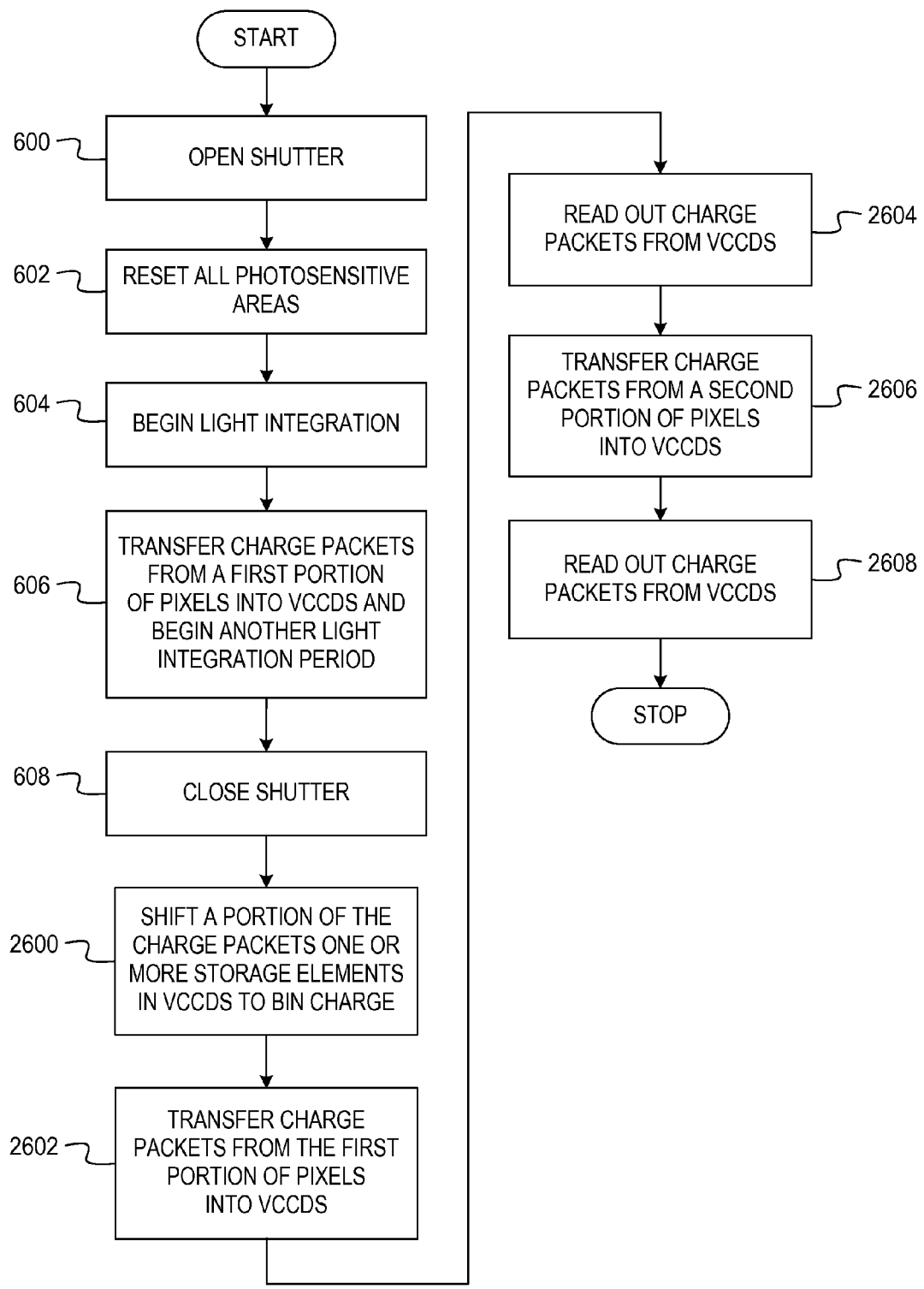
FIG. 26 is a flowchart of a fourth method for capturing and reading out multiple images and binning charge from multiple captured images in an embodiment in accordance with the invention.

Referring now to FIG. 26, there is shown a flowchart of a fourth method for capturing and reading out multiple images and binning charge from multiple captured images in an embodiment in accordance with the invention. The method uses an image sensor with a two field progressive readout illustrated by the color filter array shown in FIG. 7A (each field is comprised of a single row). This method bins charge packets within the VCCDs by shifting the charge packets within the VCCDs and by transferring charge packets into the VCCDs. Blocks 600, 602, 604, 606, 608 in FIG. 26 are the same blocks as those shown in FIG. 6. Some of the blocks shown in FIG. 26 will be described with reference to FIGS. 27A-27E, with FIG. 27A following FIG. 7C.

Figure 27A:
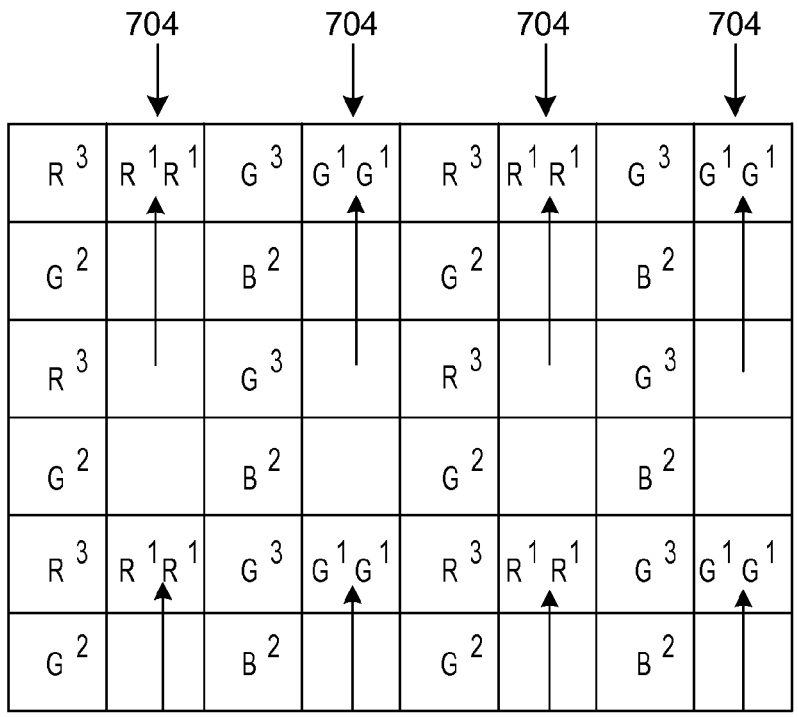
FIGS. 27A-27E are graphical illustrations of some of the blocks shown in FIG. 26.
Figure 27B:
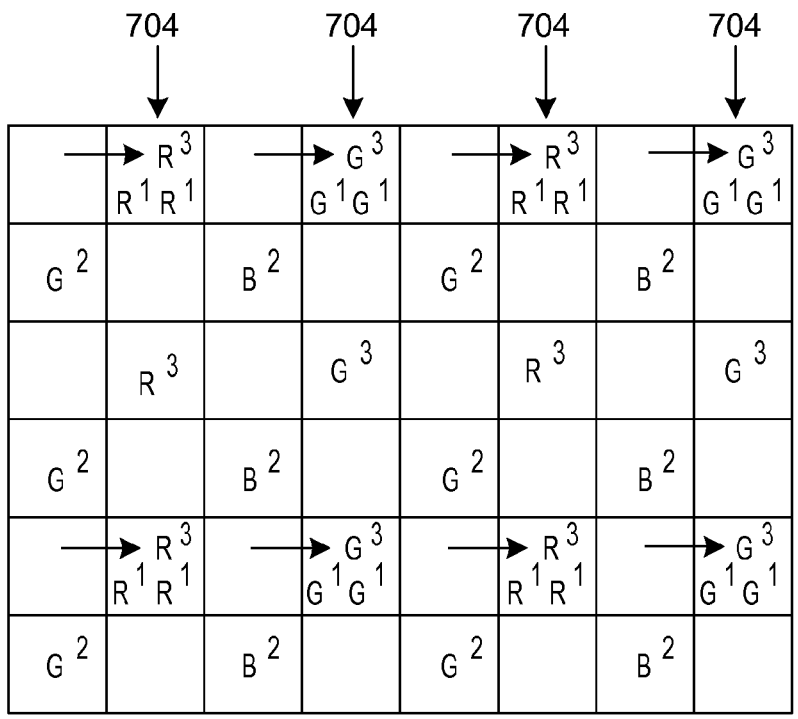

After the shutter is closed at block 608, adjacent pairs of charge packets in the VCCDs from the first portion of pixels whose charge packets were transferred into the VCCDs are binned together at block 2600 (see FIG. 27A). Thus, in the embodiment shown in FIG. 27A, charge packets having the same integration period and representing the same color (red and green) are binned together in the VCCD. The charge packets from the first portion of pixels and another integration period are then transferred to respective charge storage elements in the VCCDs (block 2602). As shown in the FIG. 27B embodiment, as a result of the transfer process in block 2602, half of the charge packets in the VCCD are then comprised of binned charge packets, two from the first integration period and one from the third integration period and the other half comprised of unbinned charge packets from the third integration period. All of the charge packets in the respective columns of the VCCDs are comprised of the same portions of pixels and as such are comprised of the same color (red as shown in the example embodiment in FIG. 27B). During the transfer and binning of charge packets from the first portion of pixels, the charge packets from the second portion of pixels are temporarily stored in the photosensitive areas of the pixels.

Figure 27C:
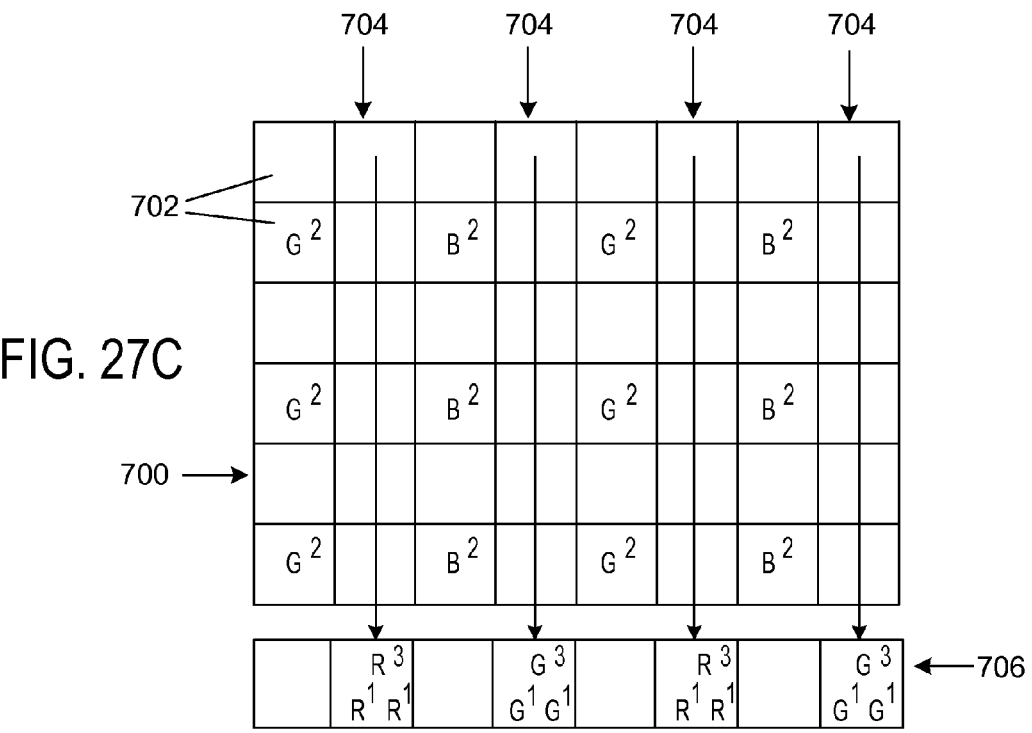
Figure 27D:
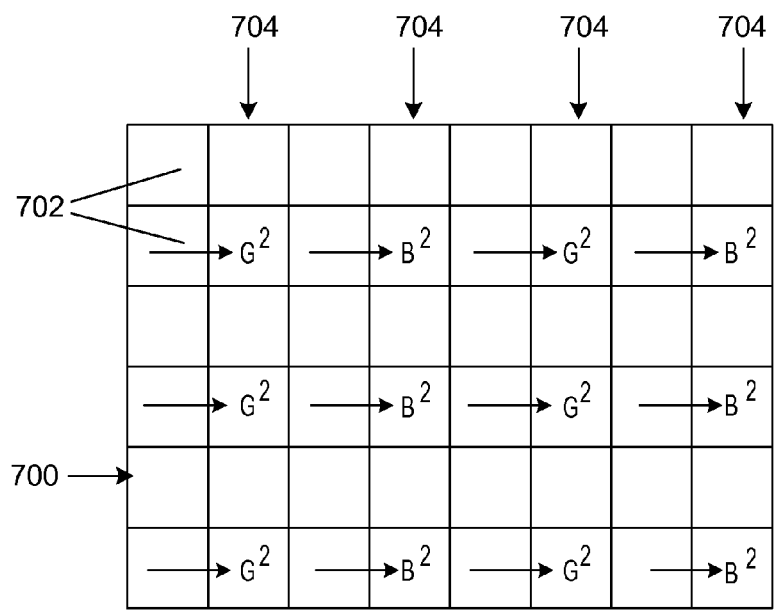
Figure 27E:
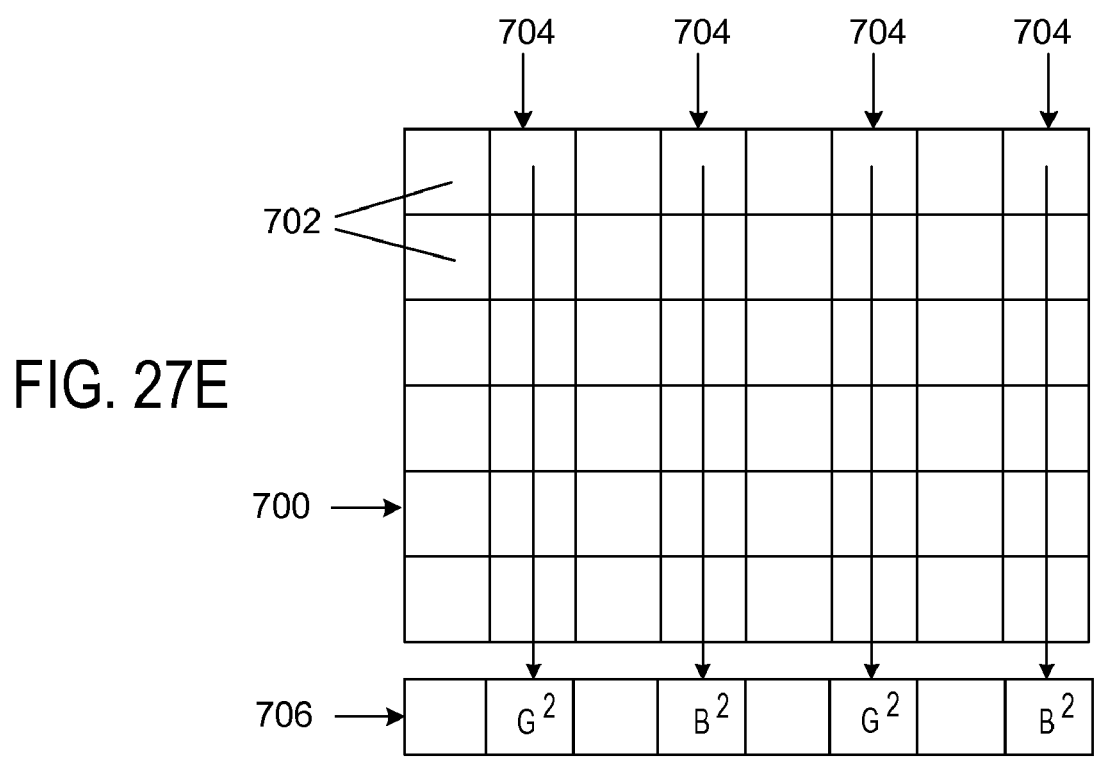

Next, as shown in block 2604, the charge packets are read out of the VCCDs (see FIG. 27C). The charge packets in a second portion of the pixels are then transferred to the VCCDs (block 2606) and read out of the VCCDs (block 2608). These blocks are depicted in FIGS. 27D and 27E, respectively. The charge packets for the second portion of pixels are unbinned and comprised of one integration time.

The invention has been described with reference to particular embodiments in accordance with the invention. However, it will be appreciated that variations and modifications can be effected by a person of ordinary skill in the art without departing from the scope of the invention. By way of example only, one or more embodiments in accordance with the invention can be implemented in a different type of image sensor, such as a CMOS image sensor. Additionally, the blocks in the flowcharts can be ordered differently, or some of the blocks may be deleted. For example, in the embodiment shown in FIG. 6, the operations depicted in blocks 612 and 616 can be switched so that the charge packets in the second portion of pixels are transferred at block 612 and the charge packets in the first portion of pixels are transferred at block 616. Alternatively, the operation shown in block 612 can transfer the charge packets from both the first and second portions of pixels simultaneously, thereby eliminating blocks 616 and 618. As another example, in the embodiments shown in FIGS. 18, 20, and 24, the shutter can be closed before the charge packets are shifted within the VCCDs.

Additionally, even though specific embodiments of the invention have been described herein, it should be noted that the application is not limited to these embodiments. In particular, any features described with respect to one embodiment may also be used in other embodiments, where compatible. And the features of the different embodiments may be exchanged, where compatible.

PARTS LIST 100 image capture device
102 light
104 imaging stage
106 lens
108 image sensor
110 filter
112 iris
114 shutter
116 exposure controller
118 brightness sensor
120 analog signal processor
122 analog-to-digital converter
124 timing generator
126 image sensor stage
128 memory
130 digital signal processor
132 system controller
134 processing stage
136 memory
138 bus
140 host interface
142 memory card
144 image display
146 bus
148 memory
150 memory card interface
152 socket
154 video encoder
156 display controller
158 user interface
160 viewfinder display
162 exposure display
164 status display
166 user inputs
200 imaging area
202 pixel
204 vertical charge-coupled device
206 photosensitive area
208 charge storage element
210 charge packet
212 charge storage element
214 horizontal charge-coupled device
216 output circuit
300 layer
302 substrate
304 transfer gate
306 opaque layer
400 pixel
402 photosensitive area
404 charge-to-voltage conversion region
406 layer
408 drain transfer gate
410 drain
412 transfer gate
414 opaque layer
700 array
702 pixel
704 vertical charge-coupled device
706 horizontal charge-coupled device
1300 color filter array
1302 first portion of pixels
1304 second portion of pixels
1400 color filter array
1402 first portion of pixels
1404 second portion of pixels
1500 color filter array
1502 first portion of pixels
1504 second portion of pixels
1506 row of pixels
1508 row of pixels
1510 row of pixels
1512 row of pixels
1700 color filter array
1702 first portion of pixels
1704 second portion of pixels
1706 third portion of pixels
2500 arrow representing the shifting of charge packets within the VCCD
2502 arrow representing the shifting of charge packets within the HCCD

The invention claimed is:

1. A method for producing multiple images with an image sensor that includes a plurality of pixels each including a photosensitive area, a plurality of vertical charge-coupled-devices (VCCDs) each comprising a plurality of charge storage elements and positioned adjacent to respective columns of pixels, transfer mechanisms for transferring charge packets from the photosensitive areas to respective charge storage elements, and a horizontal charge-coupled device (HCCD) comprising a plurality of charge storage elements, the method comprising:

beginning light integration for all of the pixels, wherein the photosensitive areas accumulate charge packets;

transferring charge packets from all of the pixels to respective charge storage elements in the VCCDs at a first time, wherein the charge packets from the pixels have a first integration period;

binning charge packets in the VCCDs by shifting a portion of the charge packets one or more charge storage elements in each VCCD;

ending light integration for all of the pixels;

transferring charge packets from a first portion of pixels to respective charge storage elements in the VCCDs at a second time, wherein the charge packets from the first portion of pixels have a second integration period that is different from the first integration period;

transferring one line of charge packets from the VCCDs into respective charge storage elements in the HCCD;

shifting the charge packets one or more charge storage elements within the HCCD;

binning charge packets in the HCCD by transferring another line of charge packets from the VCCDs into respective charge storage elements in the HCCD; and reading out the charge packets from the HCCD.

2. The method of claim 1, further comprising resetting the photosensitive areas in the image sensor.

3. The method of claim 1, binning charge packets in the VCCDs by shifting a portion of the charge packets one or more charge storage elements in each VCCD comprises binning charge packets in the VCCDs by shifting a portion of the charge packets one charge storage element in each VCCD.

4. The method of claim 1, wherein beginning light integration for all of the pixels comprises opening a mechanical shutter.

5. The method of claim 4, wherein ending light integration for all of the pixels comprises closing the mechanical shutter.

6. The method of claim 1, wherein binning charge packets in the VCCDs by shifting a portion of the charge packets one or more charge storage elements in each VCCD comprises binning charge packets of different colors and having the same integration period in the VCCDs by shifting a portion of the charge packets one or more charge storage elements in each VCCD.

7. The method of claim 6, wherein binning charge packets in the HCCD by transferring another line of charge packets from the VCCDs into respective charge storage elements in the HCCD comprises binning charge packets of different colors and having at least two different integration periods in the HCCD by transferring another line of charge packets from the VCCDs into respective charge storage elements in the HCCD.

8. The method of claim 1, wherein the first portion of pixels comprises single lines of pixels.

9. The method of claim 1, wherein the first portion of pixels comprises multiple lines of pixels.

10. The method of claim 9, wherein the multiple lines of pixels comprise multiple adjacent lines of pixels.

* * * * *